(12) United States Patent
Sundaresan et al.

(10) Patent No.: US 10,402,833 B2
(45) Date of Patent: Sep. 3, 2019

(54) METHOD AND APPARATUS FOR SOCIAL NETWORK QUALIFICATION SYSTEMS

(75) Inventors: Neelakantan Sundaresan, Mountain View, CA (US); Vasilios Mitrokostas, West Yarmouth, MA (US); Lauren Olver, The Woodlands, TX (US); Chi-Hsien Chiu, Milpitas, CA (US); Jean-David Ruvini, San Jose, CA (US); Badrul M. Sarwar, San Jose, CA (US); Hill Trung Nguyen, San Jose, CA (US)

(73) Assignee: eBay Inc., San Jose, CA (US)

( * ) Notice: Subject to any disclaimer, the term of this patent is extended or adjusted under 35 U.S.C. 154(b) by 1803 days.

(21) Appl. No.: 12/398,950

(22) Filed: Mar. 5, 2009

(65) Prior Publication Data

US 2010/0042511 A1    Feb. 18, 2010

Related U.S. Application Data

(60) Provisional application No. 61/073,727, filed on Jun. 18, 2008, provisional application No. 61/033,933, filed on Mar. 5, 2008.

(51) Int. Cl.
*G06Q 30/02* (2012.01)
*G06Q 10/10* (2012.01)
*G06Q 30/06* (2012.01)

(52) U.S. Cl.
CPC ............ *G06Q 30/02* (2013.01); *G06Q 10/10* (2013.01); *G06Q 30/0601* (2013.01)

(58) Field of Classification Search
CPC ..... G06Q 30/02; G06Q 30/0601; G06Q 10/10

USPC ........................................................ 705/26.1
See application file for complete search history.

(56) References Cited

U.S. PATENT DOCUMENTS

| | | | |
|---|---|---|---|
| 7,043,443 B1* | 5/2006 | Firestone | 705/7.14 |
| 7,512,551 B2 | 3/2009 | Postrel | |
| 7,536,323 B2 | 5/2009 | Hsieh | |
| 2003/0028585 A1* | 2/2003 | Yeager et al. | 709/201 |
| 2003/0177121 A1* | 9/2003 | Moona et al. | 707/9 |
| 2003/0227479 A1* | 12/2003 | Mizrahi et al. | 345/753 |
| 2006/0026147 A1 | 2/2006 | Cone et al. | |
| 2007/0023515 A1* | 2/2007 | Urken | 235/386 |

(Continued)

OTHER PUBLICATIONS

"U.S. Appl. No. 12/133,100, Non Final Office Action dated Dec. 22, 2010", 7 pgs.

(Continued)

*Primary Examiner* — Florian M Zeender
*Assistant Examiner* — Christopher R Buchanan
(74) *Attorney, Agent, or Firm* — Schwegman Lundberg & Woessner, P.A.

(57) ABSTRACT

There is provided a method and system for qualification testing in a social network service. Qualification testing provides access control into a social network, wherein qualification is based on answers to questions related to a topic. In one example, members admitted to the network provide guidance, notes and research assistance to another member. The social network members access the social network from an external networked computing service, such as another social network, to facilitate easy connection to potential members. The social network may be implemented as an application overlay to the external service, or may access connections in the external network.

18 Claims, 21 Drawing Sheets

(56) References Cited

U.S. PATENT DOCUMENTS

| | | |
|---|---|---|
| 2008/0140506 A1* | 6/2008 | Christianson et al. ......... 705/10 |
| 2008/0222295 A1* | 9/2008 | Robinson et al. ............ 709/227 |
| 2008/0243586 A1* | 10/2008 | Dohring et al. ................ 705/10 |
| 2009/0089678 A1* | 4/2009 | Sacco et al. .................. 715/733 |
| 2009/0171813 A1 | 7/2009 | Byrne et al. |
| 2009/0307100 A1 | 12/2009 | Nguyen et al. |
| 2009/0313088 A1 | 12/2009 | Ali et al. |

OTHER PUBLICATIONS

"U.S. Appl. No. 12/133,100, Response filed Mar. 18, 2011 to Non Final Office Action dated Dec. 22, 2010", 9 pgs.

"U.S. Appl. No. 14/133,100, Final Office Action dated Jul. 26, 2011", 7 pgs.

"U.S. Appl. No. 12/133,100, Response Filed Nov. 28, 2011 to Non-Final Office Action dated Aug. 28, 2011", 11 pgs.

"U.S. Appl. No. 12/133,100, Non Final Office Action dated Nov. 6, 2012", 7 pgs.

"U.S. Appl. No. 12/133,100, Response filed Mar. 7, 2013 to Non Final Office Action dated Nov. 6, 2012", 14 pgs.

\* cited by examiner

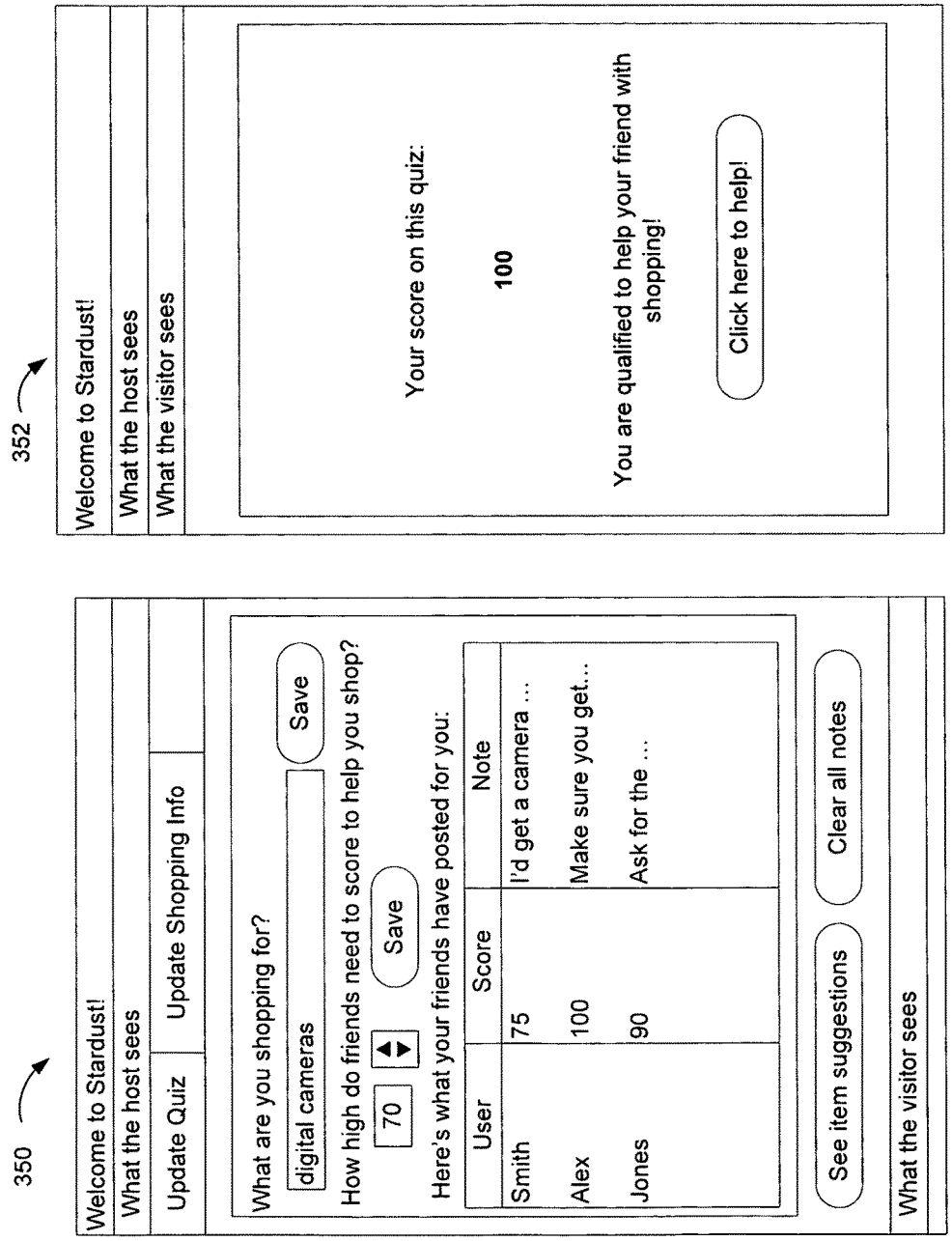

| File   View   Control   Help |

Welcome to Stardust!

What the host sees

What the visitor sees

What is my hometown?
- ○ Worcester
- ○ Mountain View
- ○ The Lost City of Atlantis What is my favorite video game?
- ○ Dragon View
- ○ Shadow over Mystera
- ○ Shadowgate What did I do last ... winter?
- ○ Broke the couch cushion
- ○ Inherited millions
- ○ Ate at Burger King .... alot How many cats do I own?
- ○ One
- ○ Two
- ○ Definitely at least ten ( < --- Go to first page )

( Check out your score! )

FIG. 16

METHOD AND APPARATUS FOR SOCIAL NETWORK QUALIFICATION SYSTEMS

CROSS-REFERENCE TO RELATED APPLICATION

The present application is based on a provisional application entitled "SOCIAL NETWORK SYSTEM", Ser. No. 61/073,727, filed on Jun. 18, 2008 and provisional application entitled "SOCIAL NETWORK QUALIFICATION SYSTEM," Ser. No. 61/033,933, filed on Mar. 5, 2008, the benefit of the filing date of which is claimed under 35 U.S.C. § 119(e) and the content of which is incorporated herein in their entirety.

BACKGROUND

Social networking encompasses communications between individuals or groups having a common interest. Within a social network, social relationships involve individuals, which are the "nodes" of the network, and relationships of the individuals, referred to as "ties." A social network is then a map of the relevant ties between nodes. Social networks facilitated or built via a networked computing environment, such as the Internet, allow users to communicate anonymously.

BRIEF DESCRIPTION OF THE DRAWINGS

FIG. 7 is a diagram illustrating User Interface (UI) for qualification testing in a social networking application, according to an example embodiment;

FIG. 8 is a diagram illustrating a UI displaying results of qualification testing in a social networking application, according to an example embodiment;

FIG. 7 is a block diagram illustrating a system including a qualification system for a social networking application, according to an example embodiment;

FIGS. 8-10 is a diagram illustrating a social networking application UI, according to example embodiments;

FIG. 13 is a diagram illustrating a UI for display for qualification testing in a system supporting a social networking application, according to an example embodiment;

FIG. 16 is a diagram illustrating a UI for qualification testing in a system supporting a social networking application, according to an example embodiment;

DETAILED DESCRIPTION

Figure 1:
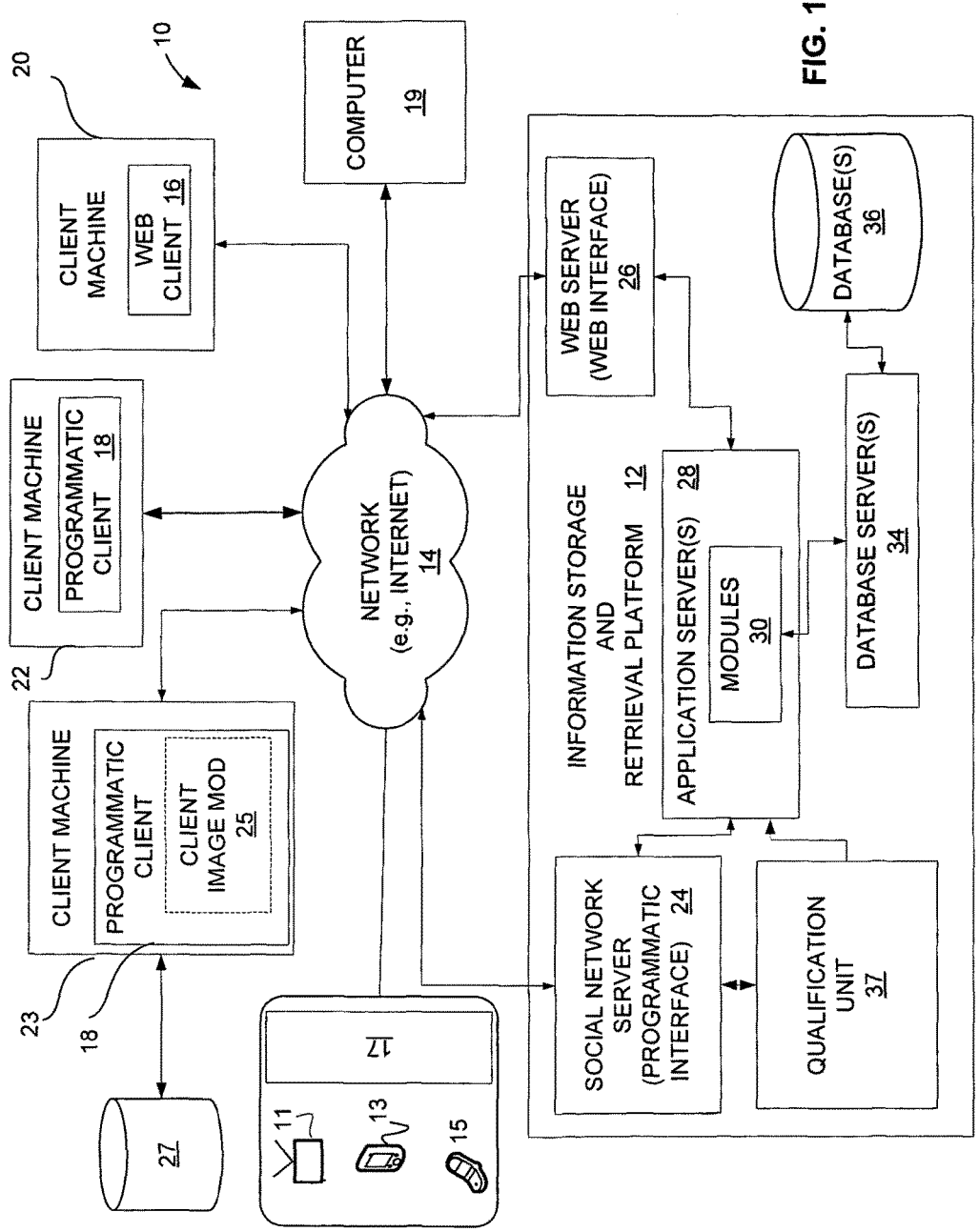
FIG. 1 is a block diagram illustrating a networked communication system supporting a social networking service, according to an example embodiment.

The following description provides numerous specific details of various embodiments and examples, for purposes of explanation and to provide a thorough understanding methods and apparatus for social network qualification systems. It will be evident, however, to one skilled in the art that the present invention may be practiced without these specific details.

According to an example embodiment, there is provided a method and a system to qualify users of a networked computing system to participate in a social network or group. The social network or group has a defined purpose for the network, wherein the method qualifies users in accordance with the defined purpose of the group. A computer system supports a transaction system (e.g., a marketplace or electronic commerce vendor), wherein at least one of the social networks or groups is formed, and is available in connection with one or more transactions. The social network may be formed automatically by the transaction system, such as from data compiled by the transaction system, or the social network may be formed by an individual or group of individuals who have defined a purpose for the network.

For example, a user within, or desiring to start, a social network group sends an invitation to another user(s) of the transaction system. The invitation requests the user(s) to participate in a social network group having a defined purpose related to the transaction system, such as those interested in or knowledgeable about purchasing a particular item or type of item. The group may compare user experiences, receive price reduction information, or suggest other related products. The requester then initiates a qualification procedure for the invited users, which procedure may be invisible to the invited user(s), and upon qualification the invited user(s) join the group. The qualification procedure and joining procedure may be automated. The qualification procedure is related to the focus of the group, and is intended to identify interested participants having requisite experience, knowledge or opinion.

In another embodiment, a social networking group is related to gaming, the qualification procedure identifies participants interested in a particular game system. The qualification testing may test whether a user has searched for the game system, purchased the game system, or purchased a book or game for a game system, etc. The social network connects individuals interested in the game system, providing information on a swap-meet type network, allowing participants to purchase or trade items related to the game system.

Each social networking group establishes a qualification criteria or criterion. Qualification processing may require an invited party to participate in a quiz or test, wherein qualification is based on performance on the quiz or test. For a given party to join a group, qualification processing comprises providing the user with a quiz or test, scoring the user's entries for the quiz or test, and accepting the user when the score exceeds a specific range. The quiz or test is specified by a group controller (e.g., creator, coordinator or moderator). The questions or challenges proposed by the test may be defined and authored by the group controller. The questions or challenges may be tailored to the purpose of the group, and used to ensure that each qualified member has a specific skill set desired by the group.

In another example, qualification questions are used to identify a party as having sufficient familiarity with a member or group of members. In this example, the invited party is qualified based on a social or professional association with a member or members of the group, or with the group controller. Such qualification questions may include questions to personal details (e.g., name and address, date of birth, name of pets) of a member of the group (e.g., the controller) to qualify for admission to the group. In an example embodiment, qualification unit 37 of FIG. 1 includes an application providing an interface enabling a group controller to create a qualification quiz or test to be administered to invitees, or as of yet unqualified users, of the transaction system, the qualification test being used to qualify invitees for admission to the social networking group.

In response to the qualification testing, a score is calculated for a party's performance on the test. The score may be displayed to the group via a group user interface. Scores are compared to a threshold value, and those having a score satisfying the threshold value are qualified. In one embodiment, invitations are sent out to a set of invitees, wherein invitees of the set are tested individually. The scores are calculated and then a predetermined percentage of scores are identified for qualification. For example, the top 10% of scores may be used as a threshold for qualification, and invitees of the set having scores in the top 10% are qualified for the social networking group. Qualified invitees become members of the social networking group, wherein members contribute advice related to the transaction system, or contribute finds to enable a transaction. These are provided as examples; each social networking group provides any number of ways for members to contribute and interact.

One example embodiment of a distributed network implementing social networking and other distributed services having qualification mechanisms for determining access to a group is illustrated in the network diagram of FIG. 1, which depicts a system 10 using a client-server type architecture. A commerce platform or commerce server, includes an information storage and retrieval platform 12, which provides server-side functionality, via a network 14 (e.g., the Internet) to one or more clients. As illustrated, system 10 interacts with a web client 16 executing on a client machine 20, a programmatic client 18 executing on the client machine 22, and, a programmatic client 18 in the form of client image modules 25 executing on client machine 23. Web client 16, in one embodiment, is a web browser, but other types of web services may be employed. In one example, the system 10 is an ecommerce system supporting auction-based transactions.

Within the information storage and retrieval platform 12, social network server 24 and web server 26 are coupled to, and provide programmatic and web interface to, one or more application servers 28. Application servers 28 host one or more modules 30 (e.g., modules, applications, engines, etc.). Application servers 28 are, in turn, shown to be coupled to one or more database servers 34 that facilitate access to one or more databases 36. Modules 30 provide a number of information storage and retrieval functions and services to users accessing the information storage and retrieval platform 12. A user accesses information storage and retrieval platform 12 through network 14, which in one embodiment is the Internet.

While the system 10 of FIG. 1 employs a client-server architecture, the present disclosure is not limited to this architecture, and could be applied to a distributed, or peer-to-peer, architecture system. The various modules 30 may also be implemented as stand-alone software programs, which do not necessarily have networking capabilities.

The web client 16 may access the various modules 30 via a web interface supported by web server 26. Web server 26 allows developer to build web pages. In one embodiment, web server 26 is used in collaboration with Java and Java technologies by Sun Microsystems of Menlo Park, Calif., as well as with Asynchronous JavaScript and eXtensible Markup Language (XML) technologies, referred to as "Ajax," which is a collection of technologies enabling creation of web applications. Ajax Java® is an object-oriented programming language developed by Sun Microsystems, that uses JavaScript, XML, Cascading Style Sheerts (CSS). Ajax enables refreshing of certain parts of a web page without a complete reload of the page. By obtaining information dynamically, web pages are faster to load and have added functionality. Ajax in particular is used to reduce network latency.

Programmatic client 18 accesses various services and functions provided by the modules 30 via the programmatic interface provided by social network server 24. In one example, programmatic client 18 includes a seller application (e.g., the TurboLister® application developed by eBay Inc., of San Jose, Calif.) enabling sellers to author and manage data item listings, each listing corresponding to a product or products, on information storage and retrieval platform 12. Listings may be authored and modified when a client machine 20, 22, or 23 is not necessarily connected to information storage and retrieval platform 12, such as in an off-line manner. Client machines 20, 22 and 23 are further to perform batch-mode communications between programmatic clients 18 and the information storage and retrieval platform 12. In addition, programmatic client 18 and web client 16 may include authoring modules (not shown) to author, generate, analyze, and publish categorization rules used in the information storage and retrieval platform 12 to structure data items and transform queries. The client machine 23 is further shown to be coupled to one or more databases 27. The databases 27 include information used by client machine 23 in implementing a service or operation, and may include specific information for products or services offered by client machine 23.

Users having access to service(s) provided by client machine 23, for example, include users of computer 19 and users of wireless network 17, which may serve as a common access point to network 14 for a variety of wireless devices, including, among others, a cable-type television service 11, a Personal Digital Assistant (PDA) 13, and a cellular phone 15.

In one example, client machine 23 enables web services, wherein a catalog of web services is stored in information storage and retrieval platform 12. Client machine 23 stores information related to use of web services in databases 27, wherein stored information is used to identify associated services and offerings. Such associated services and offerings are also listed in the catalog of web services. Additionally, each of client machines 20, 22 and 23 may also be users that search data items in information storage and retrieval platform 12.

In another example, client machine 23 is an ecommerce client offering products to customers via network 14. Client machine 23 stores a catalog of products in information storage and retrieval platform 12, the catalog of products having a corresponding data dictionary. Client machine 23 stores information related to at least one product in databases 27. The information may include frequency of searches, resultant sales, related products, pricing information, and other information related to customer use of the ecommerce service.

Additionally, databases 27 may store other product related information, such as style, color, format, etc. Client machine 23 may use the information stored in databases 27 to develop descriptor information for at least one product. Product descriptors and other product information may be used to generate and modify a catalog of products, such that a user search having keywords related to a first product may return results for a second product associated with the first service. In other embodiments, a client machine may store information in information and storage retrieval platform 12 related to business processes, or other applications which store data in a database which may be accessed by multiple users.

Still further, databases 36 may include social networking information, including data, group member lists and identification, qualification testing information, qualification scores and thresholds. Application modules 30 may include programs for executing methods and algorithms implemented by social networks. Alternate embodiments may include social network functions and storage of data specific thereto in social network modules (not shown) separate from modules 30 and databases 36.

The system 10 supports social networking functions, allowing users of the system 10 to access one or more social networks related to the system 10. Within information storage and retrieval platform 12, social network server 24 provides a programmatic interface, such as receiving requests from members of a social network group and sending invitations to users within system 10 that are not members of the social networking group. The social network server 24 maintains information relating to members of the group, as well as provides an interface for connection and communication among members of the group. The social networking group is further able to access information within system 10, including product and pricing information, detailed information relating to products, sales history information, etc. Such information is particularly helpful in determining qualification criteria for a specific social networking group.

Qualification unit 37 provides qualification testing applications, which are used to identify participants for a group in a social network, and includes memory storage capacity to store and retrieve data related thereto. The qualification unit 37 may operate on information received from client machines 20, 22, and 23, such as product or service descriptor information, as well as other information related thereto.

Figure 2:
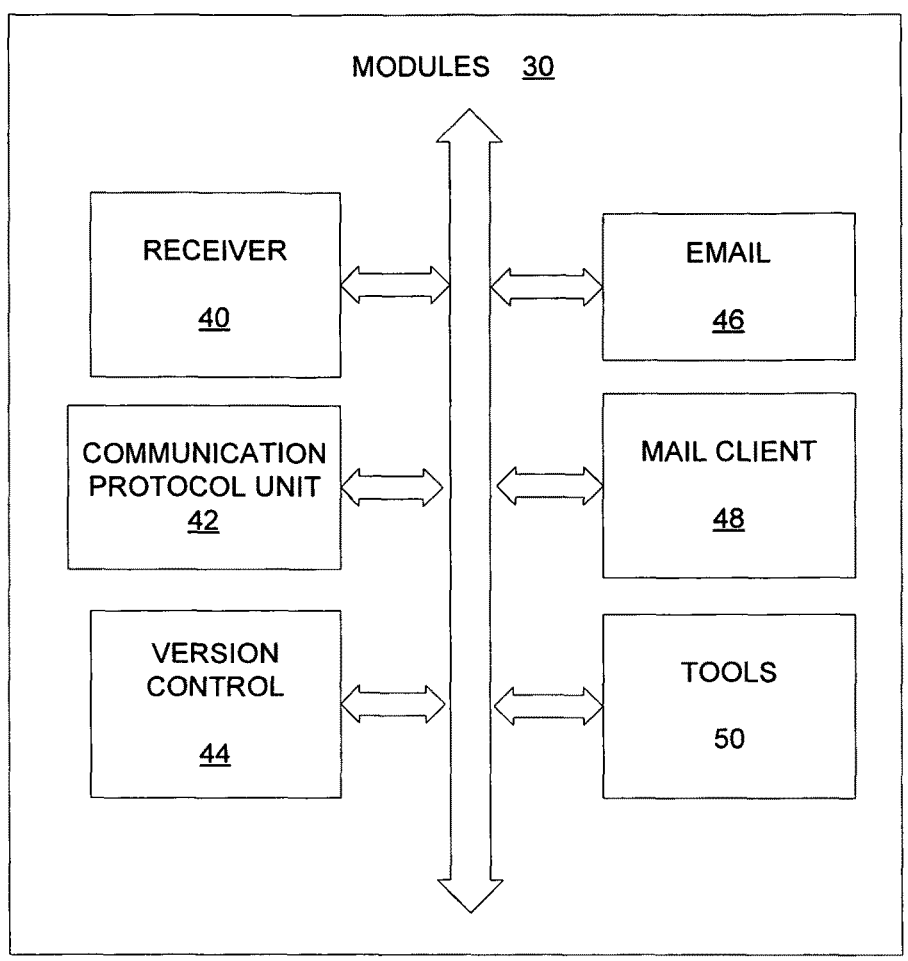
FIG. 2 is a block diagram illustrating modules within the networked communication system as in FIG. 1, according to an example embodiment.

Continuing with system 10 of FIG. 1, information storage and retrieval platform 12 includes modules 30 within application server(s) 28, wherein modules 30 is further detailed in FIG. 2. The modules 30 may include software modules or functionality of a module implemented at least partially in software. The software may be developed using a flexible programming language, such as Java. Other languages and development tools may be used according to the design and purpose and at the discretion of the system developer.

As illustrated in FIG. 2, modules 30 includes a receiver 40 to receive images and other information from entities within system 10, such as through network 14. Further included within modules 30 is communication protocol unit 42 to receive, process and transmit messages according to one or multiple communication protocols. In one example, communication protocol unit 42 processes GET-POST messages. In this example, a Hypertext Transfer Protocol (HTTP) is used to publish and retrieve text pages on the Internet. HTTP now allows users to generate numerous requests to perform a wide variety of tasks. For instance, it is possible to generate a request to obtain the meta-information of some file located on a remote server. The two fundamental request types of HTTP are GET and POST. The GET request encodes data into a Uniform Resource Locator (URL), while a POST request appears in a message body. The URL identifies a location of a participant in an HTTP communication. Typically GET requests involve retrieving or "getting" data, and a POST request is not so limited, applying to storing data, updating data, sending an email, ordering a product or service.

GET requests embed the parameters of requests in the URL as parameter-value pairs. An example of the resulting URL is provided as:

HTTP://www.site.com/get.cgi?name=John&zip=012345.
POST requests require additional space in the request itself to encode the parameters. The additional space is well used when a large number of parameters or the values are desired or required, but such a large number of parameters are too voluminous to be embedded directly into a URL. For example, a POST request is used when transferring contents of a file from a browser to a server.

Continuing with FIG. 2, an email module 46 and a mail client 48 are also included. The email module 46 provides an email application for use by the system 10 for interacting with clients. Email protocols are methods used to both send and receive email messages. The Post Office Protocol (POP) protocol provides a simple and standard way for users to download email messages from a remote server over a Transmission Control Protocol (TCP)/Internet Protocol (IP) type Internet connection. Similarly, the Simple Mail Transfer Protocol (SMTP) allows for transferring of email messages over the Internet. Each message sent over the SMTP protocol can contain various recipients, text data, as well as other encoded objects. These encoded objects may include images, documents, etc.

A mail client 48 allows communications from within other applications, such as ecommerce applications. In this way, when an issue arises during operation of the application, the application is able to send information directly to the current user of the application. Further, users are provided with a way to communicate directly with the application. In one example, mail client 48 is used to implement a chat session between a representative of the application and a user of the application. The representative may be an automated or robotic representative, pre-programmed to respond to a variety of communications. Module 30 further includes version control 44 and tools 50. Version control 44 allows programmers to keep files in a central location, allowing all programmers on a given project to simultaneously work on a set of code. In one example, Concurrent Versions System (CVS) version control software is used to track changes, and allow for reversion to previous states of files.

The tools 50 provides developer tools and software for building applications, such as to expand or enhance the image processing capabilities. In one example tools 50 includes Java servlets, or other program to run on a server. As the present example implements Java tools, some terms used with respect to Java applications and tools are detailed. A Java applet is a small program sent as a separate file along with an HyperText Markup Language (HML) communication, such as a web page. Java applets are often intended to run on a client machine, and enable services. Java applet services, for example, may perform calculations, position an image in response to user interaction, process data, etc.

In a networked computing system, some applications and programs are resident at a central server, including those enabling access to databases based on user input from client machines. Typically, such applications and programs are implemented using a Common Gateway Interface (CGI) application. When Java applications are running on the server, however, these applications and programs, i.e. Java servlets, may be built using Java programming language. Java servlets are particularly useful when handling large amounts of data and heavy data traffic, as they tend to execute more quickly than CGI applications. Rather than invoking a separate process, each user request is invoked as a "thread" in a single process, or daemon, reducing the amount of system overhead for each request.

In an application, qualification testing may be used for access control by an implementation of qualification unit 37 (FIG. 1) to enhance offerings provided by the transactional system. While described herein in the context of an ecommerce system, the transactional system could be any networked communication system providing social networking. In other environments, there is also a desire to allow users of a communication system to connect with a subset of users of the communication system. The transaction system or communication system provides the backbone for connection among group users and is, therefore, a natural starting place for creating such groups.

Further, online services, such as ecommerce systems, look for ways to enhance their users' experience and assist in better utilizing the ecommerce system. In an auction service, such as one provided by eBay, there is a desire to assist users of the service to better locate items for bid or purchase and better place items for auction or sale.

Often times, users of an online service research desired items before making purchases online. This research includes bookmarking websites and information, as well as making notes, both electronically and by hand. Service providers may provide a mechanism for storing this research and accessing for later use so as to simplify the research process. By providing tools which assist a user in using the service, the service becomes user-friendly encouraging user loyalty. Additionally, the tools may result in increased sales and activity for the service provider, as users become more adept at navigating and using the service. One example application provides a centralized online location for storing notes and bookmarks, which also allows a user to make these notes public and thereby help other users benefit from their experience and knowledge. Notes and bookmarks may be made public or private. Another example application provides recommendations for related items as well as ratings and other product related information.

Various systems may be used to provide these applications and tools for users. A key goal in designing and providing such tools is to provide a comfortable User Interface (UI). For example, a toolbar may be used to access the tools, wherein a user installs the toolbar into a web browser at the client machine. The toolbar may be viewable at the top of the browser whenever the browser is running or may be viewed when initiated by the user, such as when accessing certain websites. From the toolbar a user adds bookmarks and makes notes. A user may also create profiles for multiple contexts. For example, a first context may consider products the user would use at work, while a second context may consider products the user would purchase for their child. Additionally from the toolbar, the user accesses a webpage providing the bookmarks and notes created. The user is able to input information through the website as well, such as to provide recommendations.

Another example of a UI for service tools leverages the community-based nature of a social networking site. There are specific services providing a communication network for social networking, wherein users join the service or access the service through a service portal. The focus of the social networking service may be specific or general. Currently, the most popular social networking services are general, allowing the users to determine the focus of a group and use the service as the communication mechanism. A method and apparatus for social network qualification systems is applicable to these and other networked communication systems.

Various systems may implement qualification testing in a variety of ways, including, but not limited to, a game, a questionnaire, a quiz, monitored tracking of user activity, etc. Questions may be developed by a member of the group, typically a designated member or group controller. The question generation may be automated to identify shopping trends or personal statistics, such as a high volume shopper. In one embodiment, a social network is organized to help one or more members shop for an item. The questionnaire is related to shopping and the item, with corresponding bars for qualification. The questionnaire is intended to identify potential members that will provide guidance and advice the social network group members find helpful or desirable.

An author of a questionnaire determines which answers are considered to be correct; and further, the author determines which answers are considered to be wrong. The author may be a group of moderators for the social network, wherein the group of moderators creates the questionnaire and each moderator has veto power to exclude a question or answer from the qualification test.

The qualification testing provides an access control mechanism for entry to a group. Implementation may allow a member or members of the group to send an invitation to an invitee, or may initiate an automated process for identifying potential members without sending an invitation, or may receive a request to join the social networking group. In any of these and other scenarios, qualification testing may be used for access to the group. Similarly, qualification testing may be used to maintain membership in a group, such as for example, where a social networking group is based on high volume seller status. As an access control mechanism, once qualified to join a group, the new member has access to information and resources of the group. In one example, members have access to group member information, are able to create notes and bookmarks, and may initiate discussions.

Social networking services may be added to various systems, such as to a transactional system, by an overlay to the service architecture, or by addition of applications and architecture directed to the social network. In either case, the social networking with qualification testing may include at least one Application Programming Interface (API), and may include multiple APIs, such as a social networking API and a qualification API.

Some services and applications may desire to develop a group of reviewers for new products or new advertisements, such as an ecommerce site. In this case, the service may desire to search the users of the service, both past and present, to identify potential group members meeting certain criteria, such as purchases of a certain volume of goods, or sellers having received positive feedback from purchasers. Where qualification is automated to test a large number of potential members, additional APIs may be developed to allow batch uploading of data for qualification processing. Information regarding each one in the group of potential group members is uploaded to the qualification unit 37, and qualification testing is done. Based on the results of the qualification testing, an invitation is then sent to the qualified potential group members. On acceptance of the invitation, they are added to the group.

Figure 3:
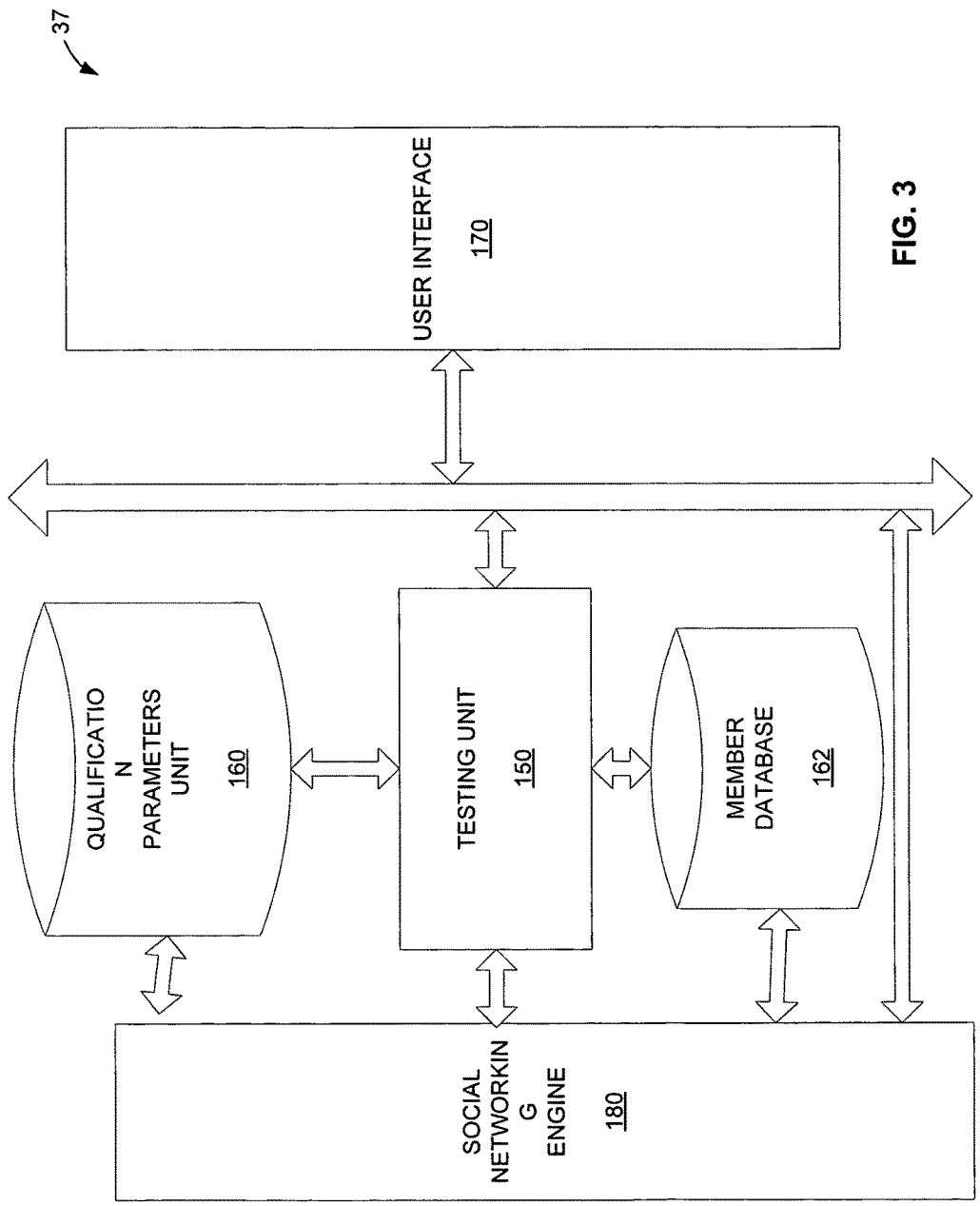
FIG. 3 is a block diagram illustrating a qualification unit according to an example embodiment.

FIG. 3 illustrates a qualification unit 37, as shown in FIG. 1, according to one embodiment, wherein qualification unit 37 works in collaboration with a social networking engine 180 and a user interface 170. Social networking engine 180 may be included in and controlled by social network server 24 (FIG. 1). Qualification unit 37 includes a member database 162 for storing qualified group member information, which includes unique identifiers for each group member, and may store personal or other information specific to group members. Such information may be compiled automatically by qualification unit 37 or social networking engine 180, and may include group member historical information related to use and activity in the transactional system. For example, group member information may include products purchased, search terms used, products offered for sale, frequency of activity, rating of member as a seller, etc.

Qualification unit 37 further includes a storage unit for maintaining qualification parameters as designated by a group controller; the storage unit is included in qualification parameters unit 160. The qualification parameters unit 160 includes questions or conditions used by testing unit 150 in qualifying invitees to join the social network group. The testing unit 150 implements the questions directed to an invitee through user interface 170. Further, testing unit 150 may retrieve information related to an invitee from within information storage and retrieval platform 12, including purchase information, preferences, user profiles with the transaction system, etc.

In one example, the social networking group functions to assist group members shop for goods. Members are able to store bookmarks to helpful websites or pages, and share their bookmarks with other members. A group member or the group controller is able to set up a "context" identifying a subject of interest. For example, a context may be a shopping context focused on digital cameras or computers. The member may specify key values for searching in this context. In one example, the context is digital cameras and a member has specified a key value of eight megapixels for searching this context, wherein a search for digital cameras IS TO screen results to those digital cameras capable of processing eight or more megapixels. Within a given context, members are able to create notes and bookmarks to relevant information. These notes and bookmarks may be kept private to the member, or a group having privileges assigned by the member. Similarly, these notes and bookmarks may be made public and available to the group, or external to the group. In one example, a member makes notes and bookmarks available to all members accessing information in a given context. In another example, a member makes notes and bookmarks available to any service users shopping in a given context.

The social networking application, according to one embodiment, analyzes notes and bookmarks within a context, and generates recommendations of related items and services. Social networking engine 180 may analyze transaction information for a transaction system, or may solicit recommendations from group members. The information may identify items currently available within the transaction system matching information found in notes and bookmarks. In one embodiment, user bookmarks and notes are automatically searched to identify key terms used or terms used most frequently. For instance, if a user has bookmarked only websites related to a specific brand of cameras, that brand camera will appear more frequently in the list of selected items.

Figure 4:
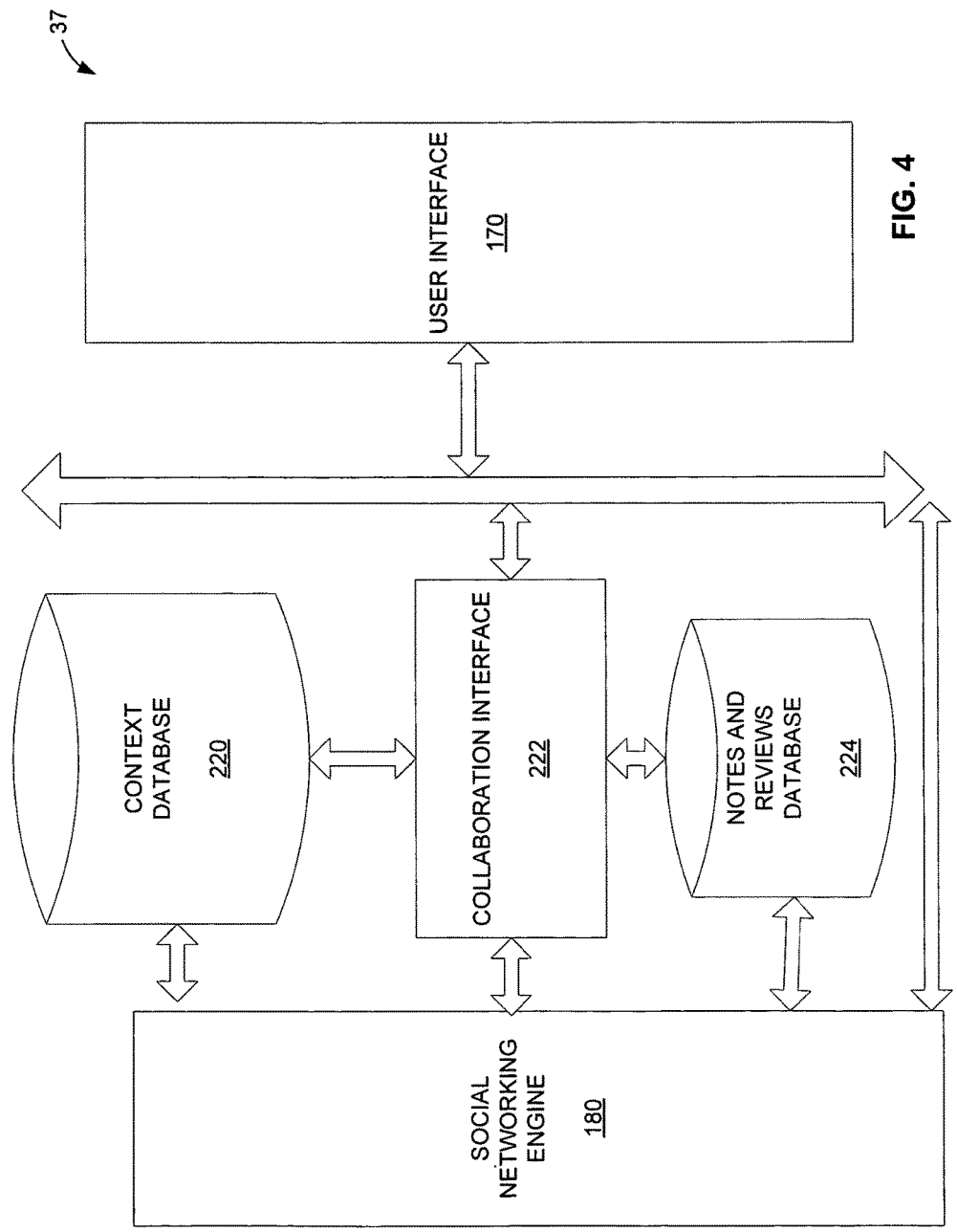
FIG. 4 is a block diagram illustrating a social network application according to an example embodiment.

Social network server 24 of FIG. 1 is detailed in FIG. 4 as in one embodiment. A social networking engine 180 coordinates with user interface 170 through collaboration interface 222. Notes, bookmarks, recommendations and other information provided by users in stored in notes and reviews database 224. Similarly, context information is stored in context database 220. Additionally, information retrieved from a transaction system or other application having relevant information is stored in notes and reviews database 224. Relevant information is information related to transaction history and activity, context information, product information, group member information, or other information related to the context and service. For example, where the social networking group is defined as a shopping group, and is designed to provide helpful product information to group members, and the context is digital cameras, relevant information may include product reviews, recommendations of other cameras, camera accessory information, comments and notes made by group members, comparative sales information, etc.

Collaboration interface receives relevant information, notes, bookmarks, comments, recommendations and other information from group members, as well as from the transaction system resources, and compiles such information into notes and reviews database 224 and context database 220. Similarly, when requested by a user, collaboration interface 222 retrieves the requested information, compiling the information for display to the requester. Collaboration interface 222 is controlled by social networking engine 180, and communicates with user interface 170 to provide display information to a group member or potential group member.

Figure 5:
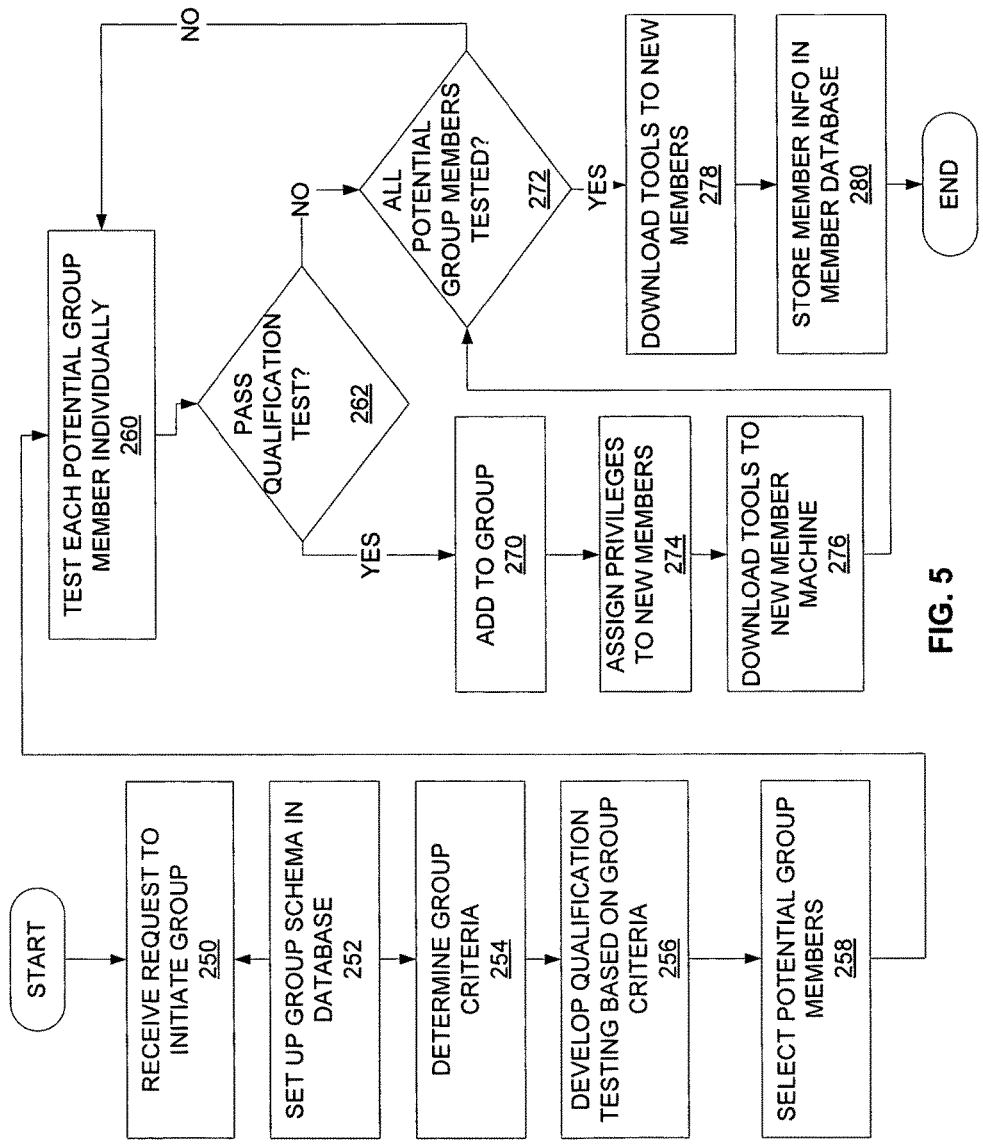
FIG. 5 is a flow diagram illustrating a method for qualification testing in a social network application, according to an example embodiment.

FIG. 5 illustrates a method for qualification of potential members to a group. The social networking engine 180 receives, 250, a request to initiate a group. Set up member schema is member database 162 to enter information, 252, as members are added to the group. The group creator determines, 254, group criteria for qualifying members for the group, and develops, 256, qualification testing based on the group criteria. Potential group members are selected, 258, and testing is performed, 260, for each potential group member individually. On passing, 262, the qualification test, the qualified party is added, 270, as a member to the group. The method assigns, 274, privileges to the new member and downloads, 276, tools to a new member machine. The method then checks, 272, if all potential group members have been tested, and if not returns to qualification testing, 260.

The method downloads, 278, tools or other information for joining as a member of the group, such tools for accessing a social networking application, to the new member. Additionally, information identifying the user is stored, 280, in a database storing member data. This information may include preferences of the member, testing score(s), as well as registration in other services.

Once a member joins the group, various tools for using the social networking service are provided, either as a download to the member's local machine, or through web access establishing a specific interface for a member browser. The tools are available to members for use in participating in the social network. One embodiment provides new members with a toolbar, which provides various options for member research within a shopping context. The toolbar may provide options to add a bookmark to current page or website, to write a note, to make a recommendation, to query other members, etc.

Figure 6:
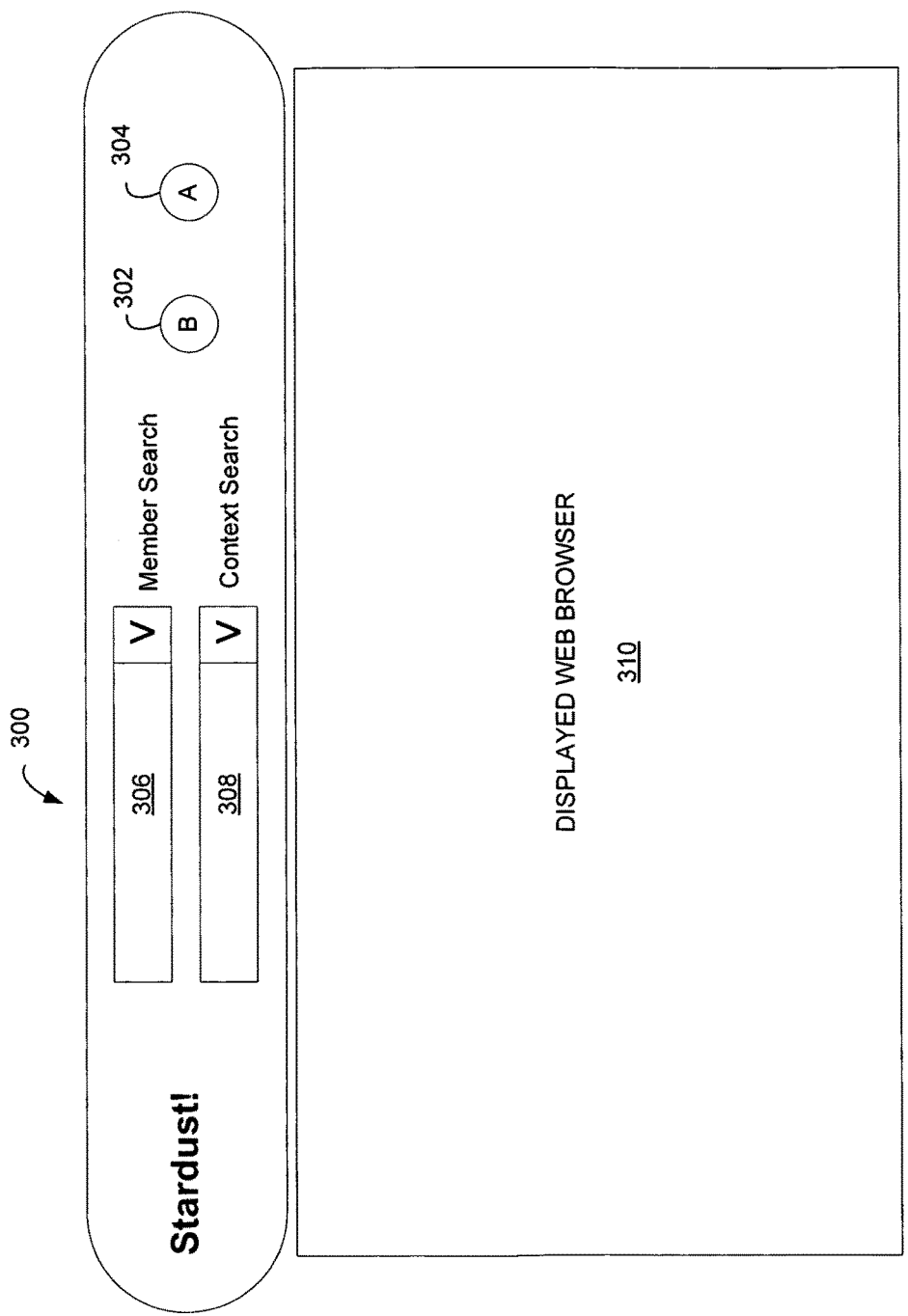
FIG. 6 is a block diagram illustrating a toolbar for presenting social network application tools with display of a web browser, according to an example embodiment.

FIG. 6 illustrates a toolbar 300 implementing tools for a member of a group, wherein buttons 302, 304, provide direct links to specific website pages. Toolbar 300 further includes a member search, 306, and a context search 308, each provided as textual entry boxes. Other functions may be added to the toolbar 300 as well, which sits at the top or side of a webpage as presented on a member's local machine's displayed web browser 310. Members are able to navigate to full-featured application websites through buttons, 302, 304 on the toolbar 300. Social network service websites are portals to member notes, bookmarks, preferences, etc., and allow member access to customized recommendations.

An alternate embodiment presents tools through use of a social networking service, such as a network directed to students and designed to allow students to stay in contact with friends. In such a system, social network users join one or more networks of people. Each user creates a personal profile page using a social networking template provided by the service. Users provide information including age, location, political view, interests and hobbies. Additionally, users upload photos and notes. A user may join multiple networks of people, wherein networks are based on common interest, school, city, workplace, etc. After joining a network, users share personal profiles with others in the network. Users may choose to personalize their profiles by adding other applications, such as an application developed by a third party not related to the social networking service. One service provides a service interaction API to allow developers to create applications for service users. The service interaction API allows access to user information and user profiles, and thus provides access to several key elements of a user's social networking pages. These applications receive space on a user's profile, which is a user's personal page containing personal information and customizations to their profile, including applications the user has added. This space typically is used to provide a link to the application's main page or "canvas" page. Applications may appear in a separate side panel displayed next to each page a user visits, or may appear as links proximate to a user's profile images.

Additionally, such applications may write stories to a user's "mini-feed," such as used in the social networking service offered by Facebook, of Palo Alto, Calif. The mini-feed is also located on the user's profile page, and contains a constantly updated list of the user's actions on a social networking site. Stories posted to the mini-feed inform friends of activities such as adding photos, updating profile information and interactions with applications. Mini-feed stories also get published on a user's friend's "news-feed," located on a user's home page, and containing an aggregation of their friend's mini-feed stories, providing constant information about friend's activities. By inclusion of an application in a user's mini-feed or news-feed, the corresponding stories are a primary way to spread applications in a social network. Additionally, the high degree of inter-user interaction makes a social networking service an efficient way to deploy applications, as the social network has the built in concept of "friends," which allows easy spread of information, while providing access control.

As used herein, a friend is a connected party in a social network. In one example, qualification testing incorporates a friends' quiz, consistent with the social aspects of the service. Here a quiz is used as an access control mechanism; qualified friends are asked to help a friend shop. To qualify, a friend achieves at least a minimum score on the quiz. Any friend achieving the minimum score is invited to be a member of the group and help a friend shop. At that point, the qualified friend is granted access to member profile information.

In an example embodiment, an API is built using Flex by Adobe systems, San Jose, Calif. Flex is a development tool, for web designers, that combines a graphical interface design system similar to Visual Basic with the ability to include more advanced functionalities using Action Script. Flex facilitates smooth creation of visually pleasing user interfaces, which is has a relation to the success and accepted use of a social networking service or application. UI 350 is illustrated in FIG. 7, wherein the interface is as presented to a group member, such as a group controller, hosting the qualification process. As illustrated, multiple tabs are displayed, including a tab for creating and editing the testing, entitled "Update Quiz," and another tab for editing the context or subject information, entitled "Update Shopping Info." The host is able to modify a quiz by updating questions and answers. In the present example, the context is to help with a shopping experience. Various questions are presented along with a field to enter a minimum qualification score to join the group. Additionally, the display includes notes at the bottom from other users, identifying their qualification scores.

In a "visitor view" (not shown), the visitor is presented with a quiz. Upon completion, and on achieving a sufficient score, the visitor is transitioned to a tab where they are able to help the host shop. FIG. 8 illustrates a display, UI 352, providing the visitor with their achieved quiz score. As illustrated, the display, UI 352, indicates the visitor is qualified to help their friend shop.

Figure 9:
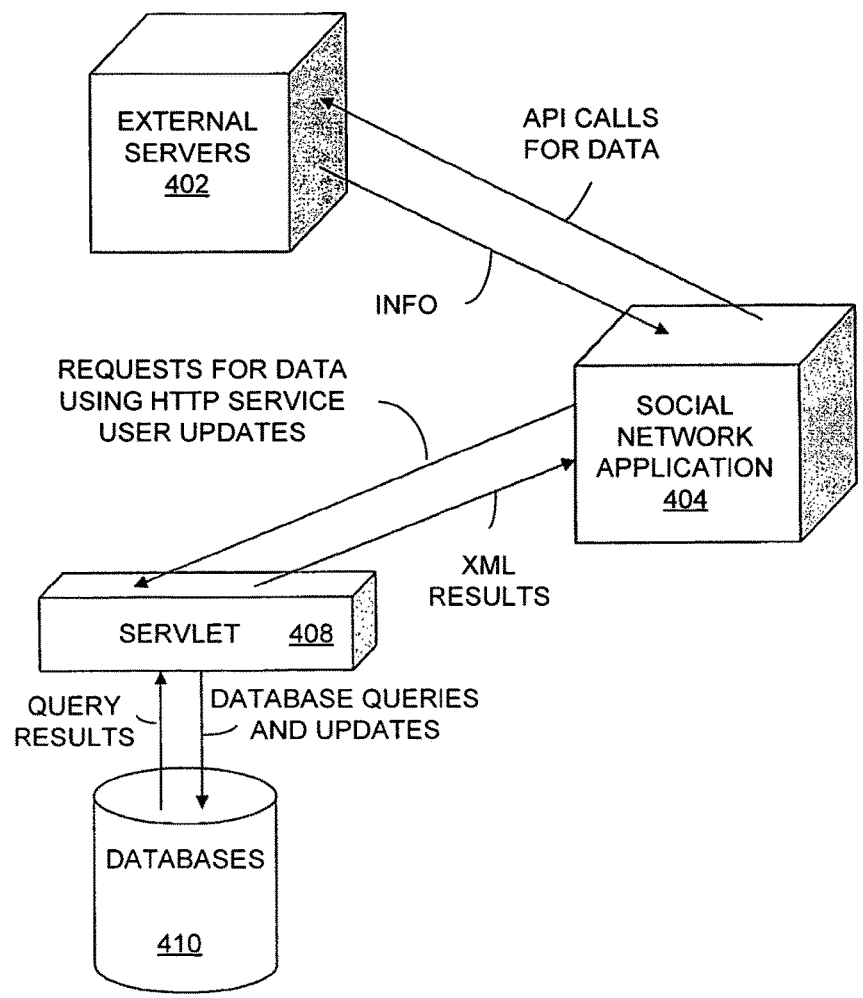
FIG. 9 is a block diagram illustrating a system configuration for implementing a social network application with external services, according to an example embodiment.

Application of such qualification methods to social networking services may include a programmatic interface to these social networking services. For example, a social networking application operating as part of, or in collaboration with, a transaction system, such as within system 10 of FIG. 1, may interface with an external social networking service, such as Facebook. The social network application 404 (shown in FIG. 9) is controlled by social networking engine 180, and provides social networking functionality to complement the functions of system 10. A programmatic interface automates communication between the two services. The social networking engine 180 sends API calls to the external servers 402 as illustrated in FIG. 9.

External servers 402 in the present example represent a social networking service; however, social networking engine 180 may interface with alternate services and systems having a group of users. A social networking service is provided as an example, as such services have groups of users and support communications of the users over a network. Social networking services typically allow users to create and maintain profiles containing personal information, as well as revealing interests of each user. By accessing an API to the external servers 402, the social network application 404 is able to utilize social networking calls to find a current user on an external network or service, write stories to the user's news feed and mini-feed, and display a list of the user's friends who are members of the social network group of system 10. Additionally, information relating to the current user's friends and their corresponding quiz scores may be provided to external servers 402 for inclusion in the external network.

There are a variety of techniques available to create applications, such as the social network application 404 implemented by social networking engine 180. The purpose of creating such an application is to extend the functionality of a transaction system, or other system, to incorporate social networking principles. In this way, social network application 404 overlays social networking functions to a base system, such as the transaction system. According to one technique, the application 404 running on social networking engine 180 is developed to run separately from the external servers 402. The social network application 404 in one embodiment is resident within system 10, and information storage and retrieval platform 12, specifically. Alternate embodiments may provide social network application 404 external to information storage and retrieval platform 12. Social network application 404 may be accessed directly, or may be accessed from external servers 402. In the former case, access is made to an address in system 10 where the application resides, such as a website or specific URL. In the latter case, a user of external services through external servers 402 connects to social network application 404 from the external service, such as by a link to a website, wherein each instantiation of social network application 404 is presented on a unique canvas page provided by external servers 402. In this way, information for display is presented to external servers 402 from social network application 404 as API calls for data, such as using a Hypertext Transfer Protocol (HTTP) communication protocol.

Specific languages and communication protocols may be implemented depending on the external service. In one example, the external service is Facebook, and API calls are made using Facebook Markup Language (FBML), a proprietary language similar to HTML specific to communication with Facebook service and applications. There are, in addition, other APIs providing smooth and efficient communication with Facebook and other social networking services, each having specific benefits in a given situation.

Further, social network application 404 communicates with information storage and retrieval platform 12 and social networking engine 180 to access information stored in databases 410. Databases 410 may include member database 162 or notes and reviews database 224, or may be a separate database containing information having a relation to databases 162, 224. Social network application 404 communicates with information storage and retrieval platform 12 via servlet 408. Social network application 404 processes GET-POST messages. In this example, HTTP is used to publish and retrieve text pages on the Internet. Using an HTTP protocol allows users to generate numerous requests to perform a wide variety of tasks. For instance, it is possible to generate a request to obtain the meta-information of some file located on a remote server. Social network application 404 is to handle multiple sessions concurrently, i.e., multiple network groups running the application, and such use is well suited for HTTP communications.

Continuing with FIG. 9, servlet 408 communicates with databases 410 by sending database queries and updates. The databases 410 responds with query results.

In one example, a Web Programming Interface (WPI) account (not shown) is associated with the external servers 402. The external servers 402 may request information from the information storage and retrieval platform 12, which is forwarded through social network application 404 and servlet 408. An address of social network application 404 run by social networking engine 180 is recorded on the external servers 402, which is then provided to a requester accessing external servers 402. Social network application 404 makes calls to external servers 402 to request user and friend information. Upon receipt, this information is used within social network application 404. The social network application 404 may also make calls to the servlet 408 to load user data, save user data and update and save notes.

Some applications and protocols used to implement social network application 404 do not allow direct database interactions, but rather send information using an HTTPService request. The HTTPService request can send or receive XML data over HTTP. To access data using this method, a Java servlet, such as servlet 408, allows social network application 404 to interact with databases 410. The servlet 408 may run on an outside-facing server from within information and storage retrieval platform 12 with connection back to social network servers 24. The social network servers 24 are configured to allow requests from the social network application 404 using a configuration file. Queries are sent to servlet 408 as:

http:/Server_Address/applicationjsf/Facebook?com=command&parameter=value wherein Server_Address is the location of social network server 24 where servlet 408 is running. Further, command is the specific action to perform, parameter is a sequence of specific, predefined parameters used to perform the command, and value is a value of the given parameter. The commands available in one embodiment are listed in Table 1 below.

TABLE 1

Qualification System API Commands

| Command | Parameters | Action |
| --- | --- | --- |
| getUser | fbid | Returns all user information, quiz data and shopping information about the user with the Facebook ID fbid |
| storeQuiz | uid num q a1, a2, a3, c | Stores an entire quiz for the user with The example application ID uid. Num is the number of questions in the quiz. For each question, q is the question, a1, a2 and a3 are incorrect answers, and c is the correct answer. |
| updateQuizEntry | qeid q a1, a2, a3, c | Updates a single question in the quiz specified by qeid. q is the question, a1, a2 and a3 are |

TABLE 1-continued

Qualification System API Commands

| Command | Parameters | Action |
|---|---|---|
| | | incorrect answers, and c is the correct answer. |
| deleteAllQuizEntries | uid | Deletes all entries associated with the example application user specified by uid. |
| deleteQuizEntry | qeid | Deletes specific quiz entry defined by qeid. |
| addQuizRecord | uid f s d | Adds a record that the application user, specified by uid, took the quiz of user f, received a score of s, on date d. |
| deleteQuizRecords | uid f | Removes the quiz record of taking the quiz of user f for user specified by uid |
| addNote | uid t p u | Adds a note for the application user specified by uid. The note contains text t, permissions p, and, if necessary, a url u. |
| delNote | uid n | Deletes note from user specified by uid. The particular note to delete is specified by note n. |
| delPrivateNotes | uid | Deletes all private notes for the user specified by user id uid. |
| getNotes | fbc | Returns all notes related to the context specified by Facebook Context fbc. |
| getNotes | u | Returns all private notes for the user with the user id specified by u. |
| getNotesWithScores | u | Returns all private notes for the user with user id u, as well as the scores associated with users that have left the notes |
| updateNote | uid n t p | Updates note with noteid n for user specified by the user with uid u. The note's text t and permissions p can be updated. |
| updateUser | uid s d fbc | Updates user specified by uid. This can update s, the score to be reached on the quiz to help them shop, d, the date the quiz was modified, or their shopping context, fbc. |
| createUser | fbid fname lname sc dt fbc | Creates a user in the application database, returning an XML file with the users The example application id. The user's Facebook ID fbid, first name fname, last name lname, initial score cutoff for friends sc, date created dt, and initial Facebook shopping context fbc are used to populate the database. |

These commands provide functions used to interact with information stored in the application databases 410. Information was returned from servlet 408 in XML format using XML schema, defined by the API creator, and which is a nested structure populated by defined elements, such as user ID and notes. An example XML file containing user information loaded during an initialization phase may include:

```
<?xml version="1.0" encoding="UTF-8"?>
    <the example application>
        <user>
            <fbid>29100485</fbid>
            <uid>48</uid>
            <fbcontext>camcorder</fbcontext>
            <contextid>104</contextid>
            <score>50</score>
            <date>1204061447671</date>
            <notes/>
            <quizentries/>
            <quizrecords/>
        </user>
    </the example application>
``` wherein a user's Facebook ID is provided, as well as an application ID. For the present shopping example, the information further contains a shopping context name and ID number corresponding to the context for which a user is invited to join the network group. Further, as access to the network group is controlled by qualification testing, the information may provide a location of the quiz, a version of the quiz for the user to access, as well as indicating the minimum score for friends to be able to join the group. Members of the group have privileges to leave notes, access notes of other members, and access quiz entries and scores. By accessing the schema, it is possible to parse results of an HTTPService call and automatically update associated variables within the social network application 404.

Figure 10:
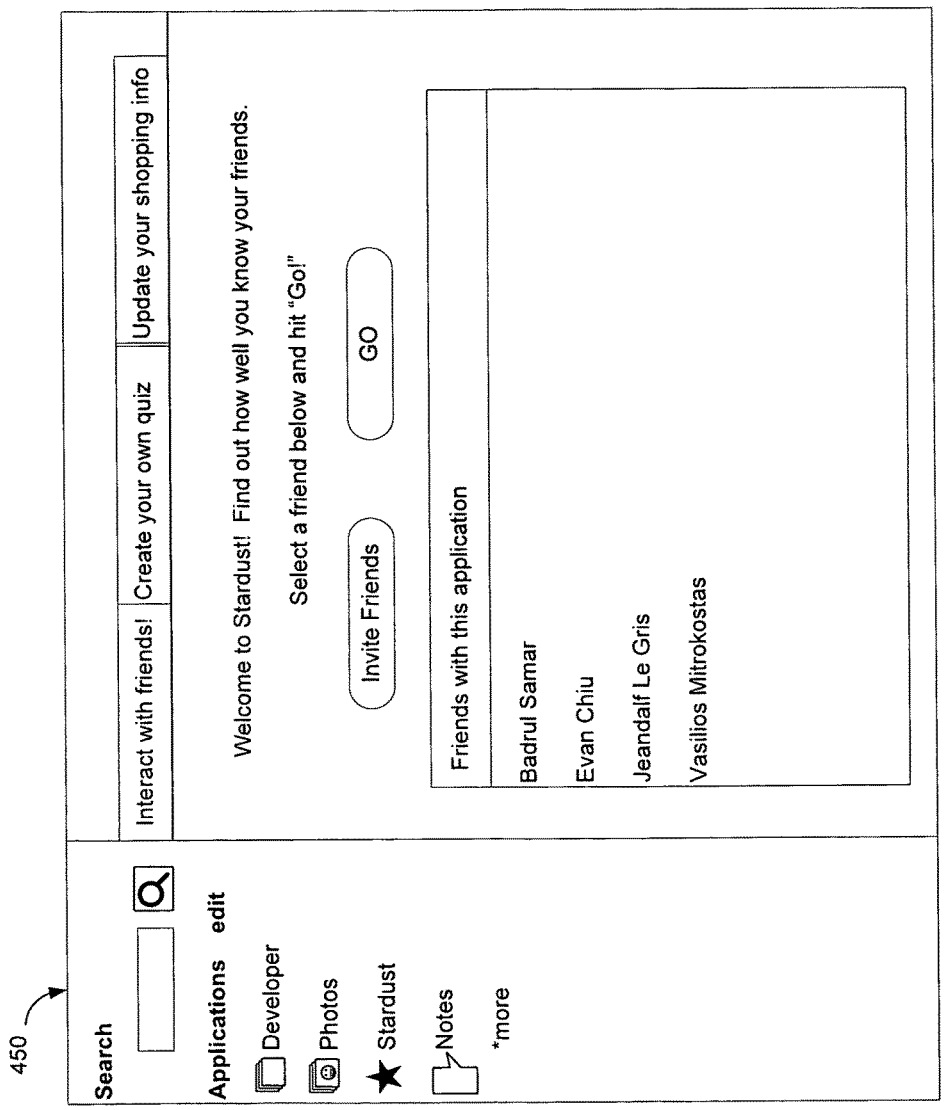
FIG. 10 is a diagram illustrating an example of a UI for external services, such as a social networking service, having an Application Programming Interface (API) to incorporate features of a social network application, according to an example embodiment.

FIG. 10 illustrates a group member display after incorporation with an external service. UI 450 includes multiple tabs, including a first tab with direct connection to the external service. The other tabs illustrated in FIG. 10 provide access to features of social network application 404 offered by social networking engine 180. As illustrated, the external service is active in a window of UI 450, allowing a member to identify friends and invite any one of these friends to take the qualification quiz to help with shopping.

UI 450 is a tab based interface, indicating the window displayed has multiple layers, each accessed through the tabs. Tabs allow members to see their friends having the social network application 404 installed. Additionally, a member is able to create a quiz, modify their own quiz, and update their shopping information. A member is able to access friends' quizzes from the member's page. In one example, application 404 determines which friends have quiz scores that may be of interest to the member. The member is able to select a friend from a list of friends having the social networking tools installed, and is able to retrieve corresponding quiz score information. The member is also able to send invitations to take the quiz to friends. For members of other groups using social network application 404, such information may be automatically retrieved by social network application 404 or social networking engine 180, or may be directed to friends' shopping information where access is allowed.

Providing the social networking features on an external server involves creation of a page on the external service. Such a page is dedicated as an entry port for the social network application 404, which may be externally hosted or resident within information and retrieval platform 12, and controlled by social networking engine 180.

It may be difficult for the social networking engine 180, or application 404, to verify which friends a member wants to automatically invite. One embodiment allows the member to specify friends for invitations, or confirm friends identified by social networking engine 180. When friends access the application 404 from a profile page, the friend may be given privileges allowing the friend to select a qualification quiz for admittance to a social network group. In one example, a profile page displays a user profile. Similarly, a group profile page displays a group profile. A profile page may identify, link to, or have direct access to applications and widgets associated with the profile, such as applications to which a user subscribes.

Where external servers 402 do not provide data storage, user details, shopping information, and quiz information are saved onto the social network server 24, as this is the server hosting the web-based social network application 404 and the databases 410.

One embodiment includes a "splash" page, which is an initial entry page displayed when social network application 404 is accessed. A splash page provides new members, and invitees, a brief overview of social network application 404, including tutorials and details of application features, which allows abbreviation of text provided on individual tabs of the application. Additionally, use of a splash page provides additional time for the various components of social network application 404 to initialize and complete communications with external services as well as social networking engine 180. Such additional time is desirable when implementing social network application 404 using a program such as Flex. These programs typically rely on user interactions before taking specific actions, restricting function call order. Flex in particular simultaneously continues internal computations while external calls for data are made. Latency may exist when new members are added to the system. Calls are made to external services to determine the user information immediately, while internal computations continue. Such internal computations may require information from the external services. Creation and presentation of a splash page provides adequate time to perform API calls allowing presentation to a user without noticeable delay.

To access social network application 404 from external services, a user of the external services selects an icon on a page of the external services. The page may be accessed through a user's profile, a friend's profile or a list of applications on the site. When a user of external services has not set up social network application 404, access requests to access social network application 404 are redirected to the splash page of the social network application 404. The external service standard pages contain information about social network application 404, such as on a bulletin board referred to as a "wall" where users post questions and opinions, or a review area where users rate applications and features. From such a page, an external services user may elect to add social network application 404.

Figure 11:
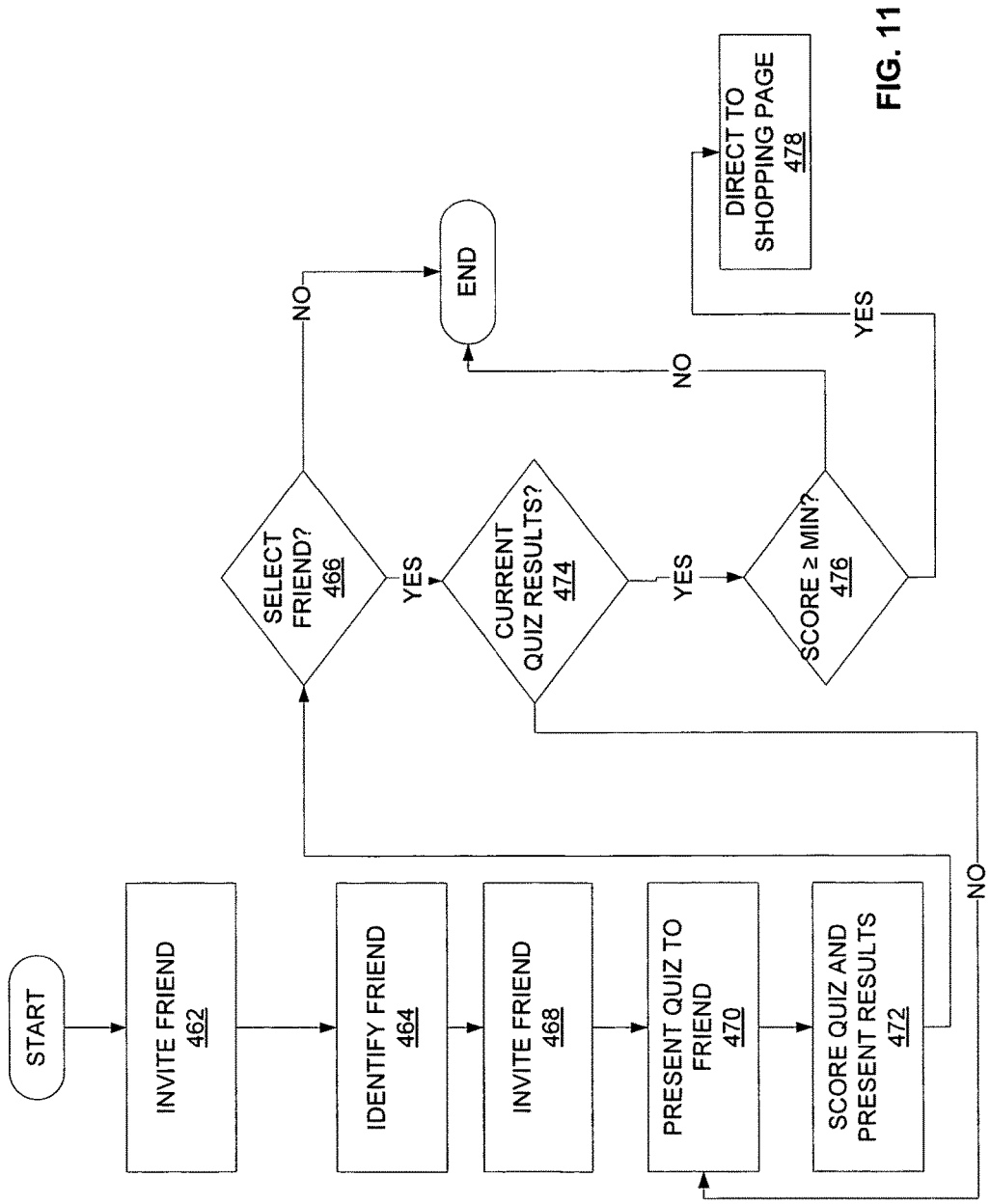
FIG. 11 is a flow diagram illustrating qualification testing in a system supporting a social networking application, according to an example embodiment.

When an external services user adds social network application 404, such as to access the network or join the network, the user may click on a link on their external services page, and be redirected to the splash page of social network application 404. Regardless of a point of origin, the user is presented with a tab containing a list of all of friends also using social network application 404, as illustrated in FIG. 10. From this tab in window 450, the user is able to interact with their friends. The user is able to invite a friend, using the button "Invite Friends." The method is illustrated in FIG. 11, wherein a friend is invited, 462. In response, the application 404 will ask, 464, the user to identify a friend to invite, 468, to the social network group. Social network application 404 then presents, 470, a quiz to the friend. When the friend agrees to take the quiz, social network application 404 presents, 472, a score both to the original requester and the friend.

The user is able to select, 466, a friend for a current application session, such as to help with shopping. In the example illustrated in FIG. 10, the user has a list of four friends that already have access to social network application 404. The user may select a friend and then use the "Go!" button. When a friend is selected, 466, social network application 404 checks, 468, whether the user has taken a current version of a friend's quiz. If not, the method presents, 470, the current quiz to the friend, scores the quiz, and presents, 472, the results. The method checks the current quiz results, 474, to verify which friends have taken the quiz. Further, for those friends having taken the quiz, the method checks the scores, 476, and directs, 478, those friends having a score at or above the minimum score to a shopping page. When a friend did not achieve the minimum score, however, the friend is sent an alert indicating their failure to satisfy the minimum score. When a friend has not taken the quiz yet, or has not taken the most current quiz, social network application 404 presents, 470, the quiz to the friend.

Figure 12:
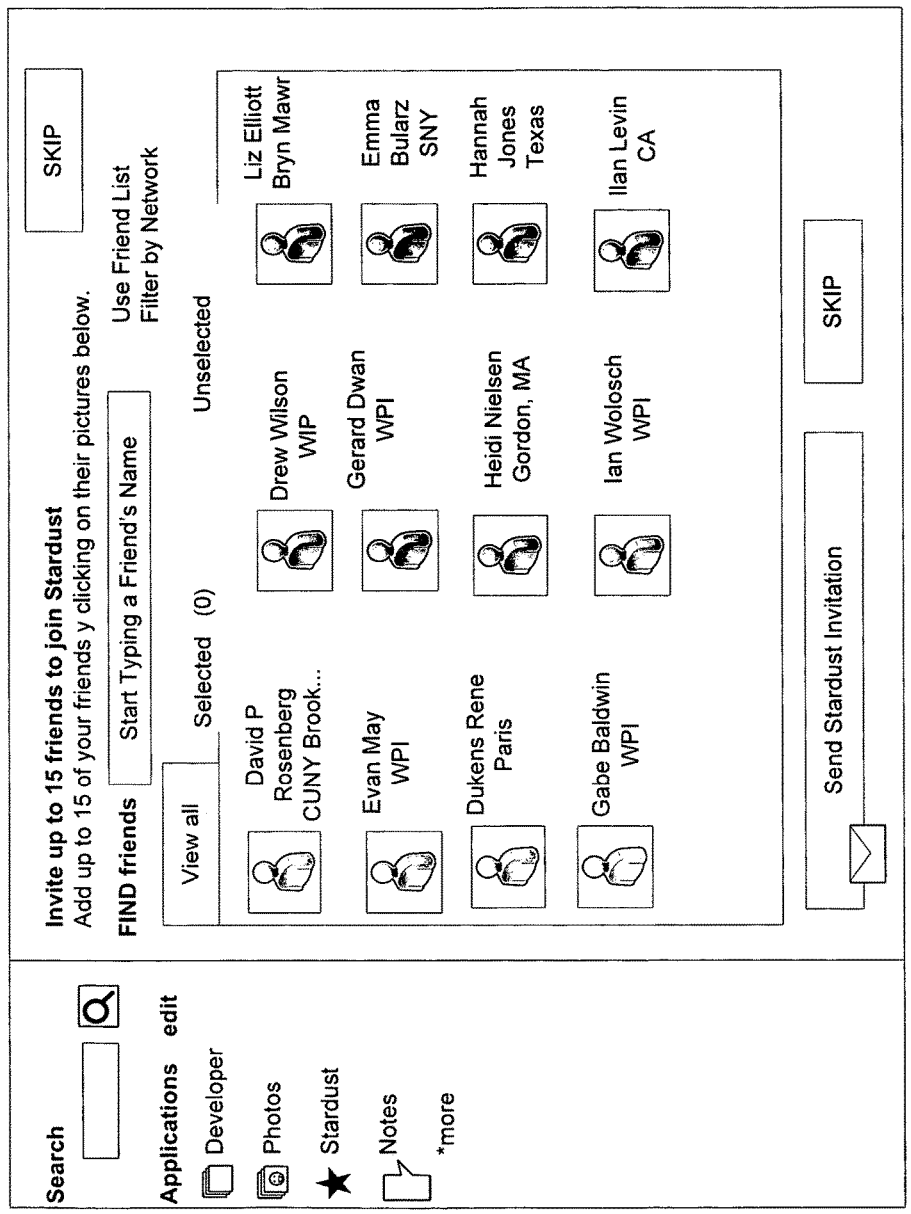
FIG. 12 is a diagram illustrating a UI for display to a user in a social network, according to an example embodiment.
Figure 13:
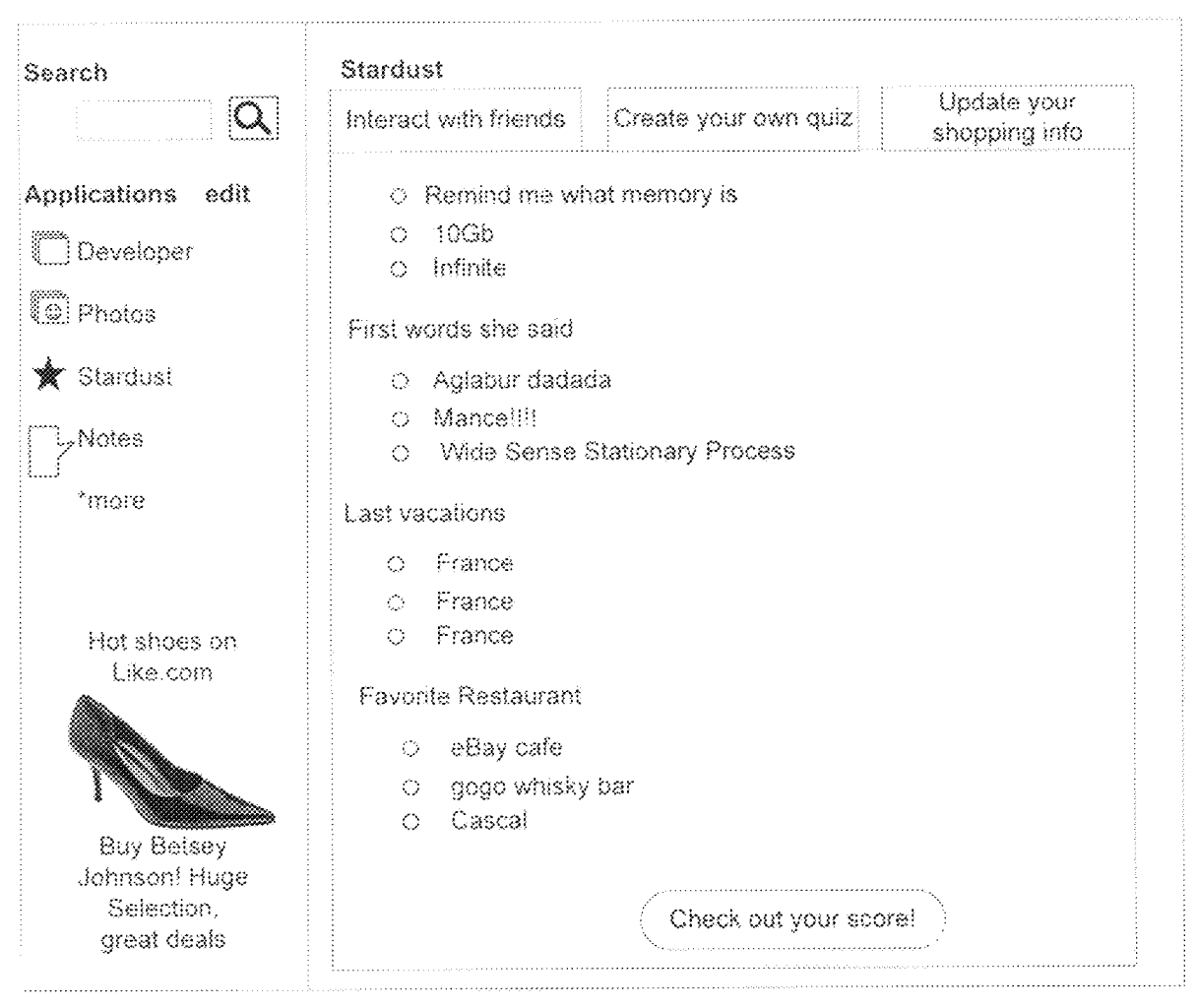

When a user desires to invite a friend to join the social network group, a display, such as a UI illustrated in FIG. 12, is presented to the user. The display identifies friends and other associates available for invitation. When a friend chooses to accept the invitation and take a quiz, the quiz questions are retrieved from social network application 404, which dynamically presents quiz questions in accordance with the number and type of questions prepared. An example quiz presentation is illustrated in FIG. 13. Here several questions are presented, which have check boxes to record answers. Once the quiz is completed, the friend is able to select the button "Check out your score!" to score the quiz and receive the results.

Figure 14:
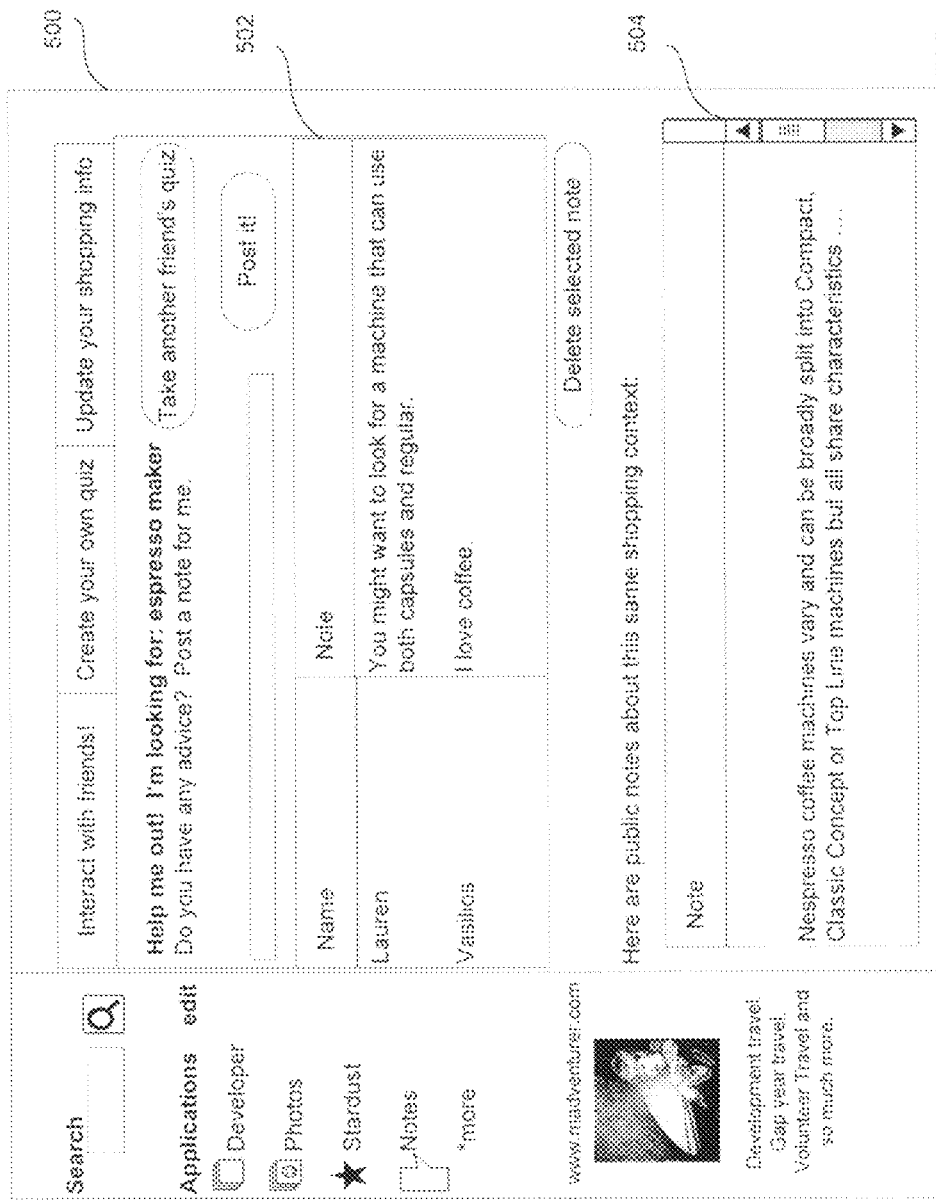
FIG. 14 is a diagram illustrating a UI for collaboration in a system supporting a social networking application, according to an example embodiment.

When the friend scores at or above the minimum score, the friend is directed to a shopping page. On this page, they can view their friend's shopping context (i.e., what they are shopping for), and leave notes. As illustrated in FIG. 14, a page 500 is made up of two distinct sections, 502, 504. Section 502 is a private note section, where group members may author notes related to shopping and the current shopping context, specifically. The notes within section 502 are editable, so as to remove notes or add annotations or other information to the notes. Notes may be sorted according to various criteria, for easy viewing and searching.

Additional information may be listed with the notes, such as quiz score, rating of note author as a high volume seller, etc. As illustrated at the bottom of the page, public notes are listed in section 504 to view public notes left about the shopping context. Public notes may relate to an item for purchase, shopping in general or shopping in a specific context. Public notes are displayed and accessible by any group member. Public notes are not modifiable on page 500 in one embodiment. In an alternate embodiment, amendments to public notes, as well as annotations and comments, are available publicly as well, or may be made private.

Continuing with the display of FIG. 14, various tabs are presented, and alternate embodiments may include these and/or additional tabs. The tabs allow creation of a quiz for a context. The tabs allow a user to update shopping information. Note, shopping is used throughout these examples to clarify qualification methods and apparatus in a social networking environment, however, other group interests may provide a context as well. For example, a group context may relate to creation of advertising for products to offer for sale or auction, wherein a group of sellers provides guidance and assistance in preparing items for sale.

Figure 15:
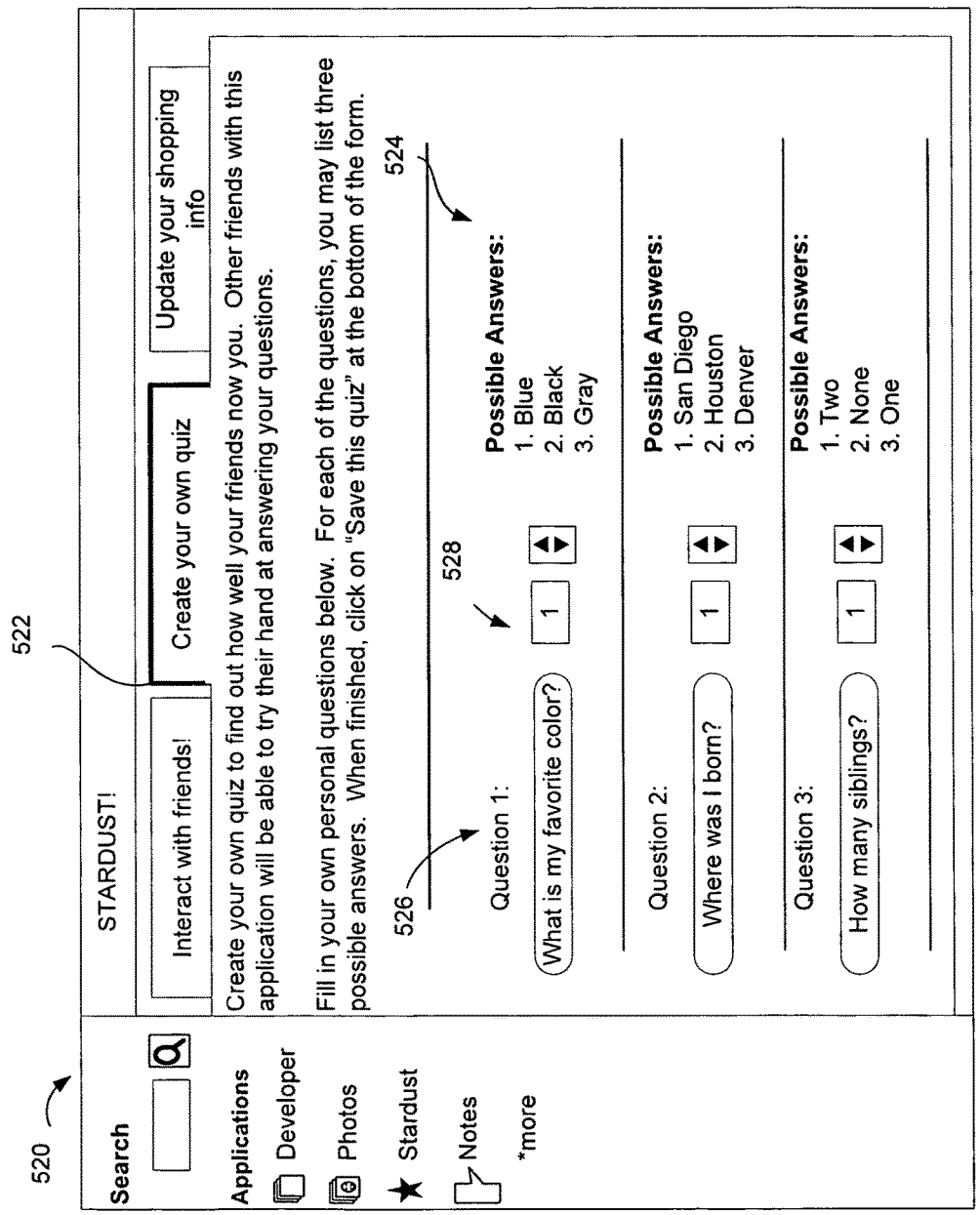
FIG. 15 is a diagram illustrating a UI for creation or modification of a qualification quiz in a system supporting a social networking application, according to an example embodiment.

FIG. 15 illustrates a UI 520 presented for creation or modification of a quiz. Within the tab 522, entitled "Create your own quiz," are presented ten questions 526, wherein each question includes a text field 524 displaying a question along with three text fields for entry of multiple choice type answers. Further, a box 528 provides a mechanism for a visitor, invitee or other quiz taker, to select a correct answer. A quiz may include any number of questions, wherein scoring is based on the number of questions actually answered. Similarly, scoring may be relative to the number of friends taking the quiz. Scoring may be a function of the score results, such as where an individual result is considered in relation to an average of other scores.

FIG. 16 illustrates an alternate UI 529 for presentation of a qualification quiz, wherein questions are hard coded into the system 10, and answers are selected by check buttons. The questions may be presented over multiple pages. At the end of the quiz, the invitee or visitor is able to check their score on the quiz. Note that a group member of a first social network group supported by social network application 404 may be asked to join a second social network group. In this situation, the group member of the first social network group is an invitee or visitor to the second social network group.

Quiz results may be scored or calculated by comparison to target answers identified on creation of the quiz. In one scenario, each matching answer accumulates points, while answers that do not match receive no points. In this way, a minimum acceptable score reflects the number of answers the quiz taker is to match in order to gain access to the group.

In another embodiment, questions are weighed, giving preference to specific questions. When an answer matches a target answer, the corresponding score for that answer is accumulated to the score. Various schemes may be implemented to weigh and evaluate answers. In still another example, quiz results provide an indication of the sophistication of a visitor in the desired context. Quiz scores in a first range of values indicate a first level of sophistication or knowledge in this context, and scores in a second range of values indicate a second level of sophistication of knowledge in this context. Group members are then identified according to the results. In still another example, as each quiz question is answered, a score is calculated, thus accumulating the score. If the score exceeds an interim threshold value, the set of questions is modified. For example, the questions may be modified to use a more difficult or more focused set of questions. The modified questions have higher score values for matches.

Figure 17:
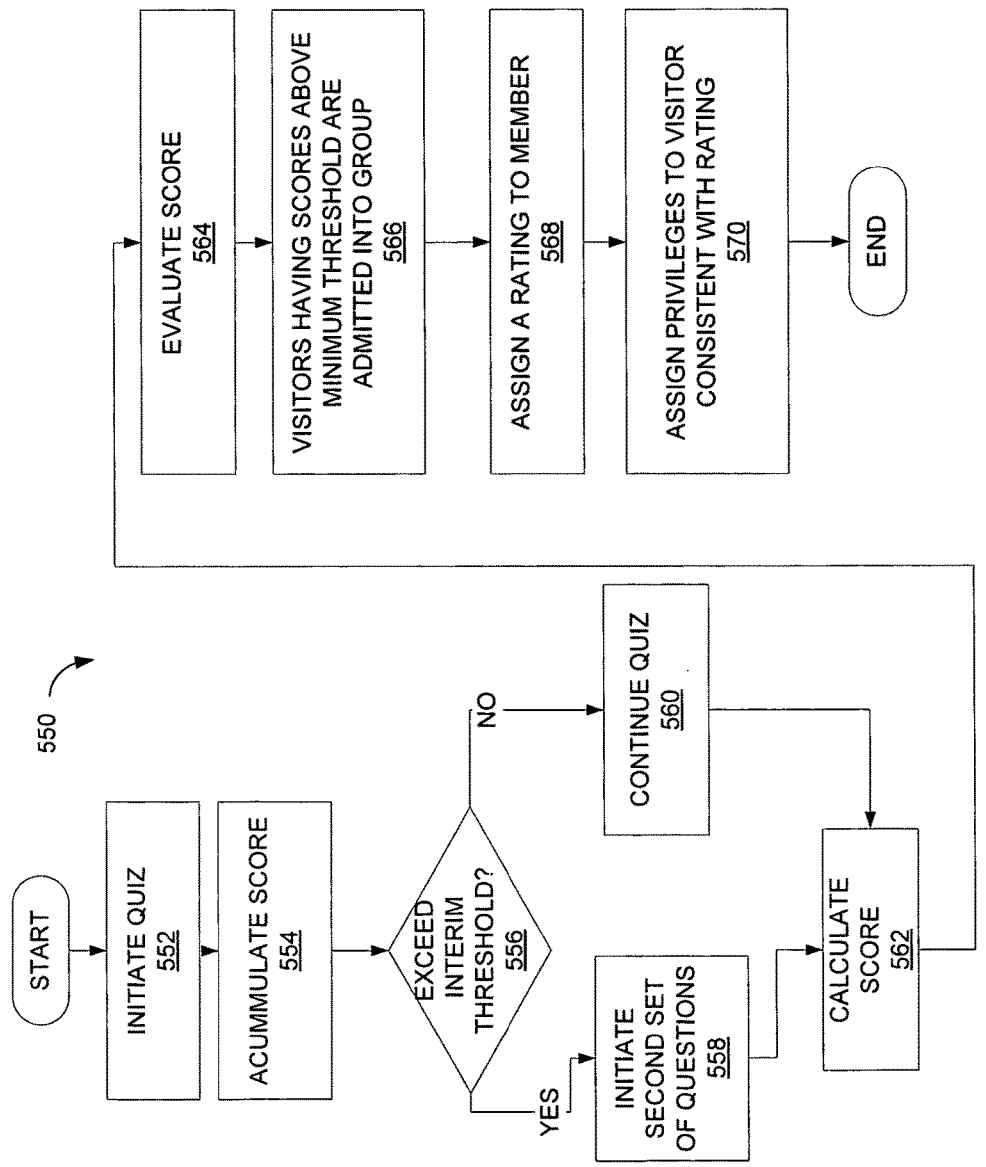
FIG. 17 is a flow diagram illustrating a qualification test method, according to an example embodiment.

FIG. 17 illustrates a flow diagram of a scoring method 550 for qualification testing for access control to social network application 404. The method 550 allows for simple calculation of a score by comparing answers to target answers and further allows for an adaptive qualification testing, wherein questions are modified in response to a successively accumulated score. As illustrated, the method 550 initiates, 552, a quiz with accumulated scoring. In this example, the score of a quiz is calculated each time a new answer is entered, wherein the method accumulates, 554, scores. The accumulation may be done after a predetermined number of questions are answered, or may be done continuously as each new answer is provided. In one embodiment the score is updated after entry of each answer. In an alternate embodiment, an interim point is set at which an interim score is calculated. The interim score, or accumulated score, is compared, 556, to an interim threshold. The interim threshold will be different depending on when the score is accumulated. For example, the score may have an incrementally increasing threshold. If the score exceeds the interim threshold, a second set of questions may be initiated, 558. Else, method 550 continues, 560, with the original set of questions. When the quiz is complete, a score is calculated, 562, and evaluated, 564. Visitors having scores above a minimum threshold are admitted, 566, into the group. Each member is then assigned, 568, a rating based on their final score. Method 550 assigns privileges to each member according to the rating.

Figure 18:
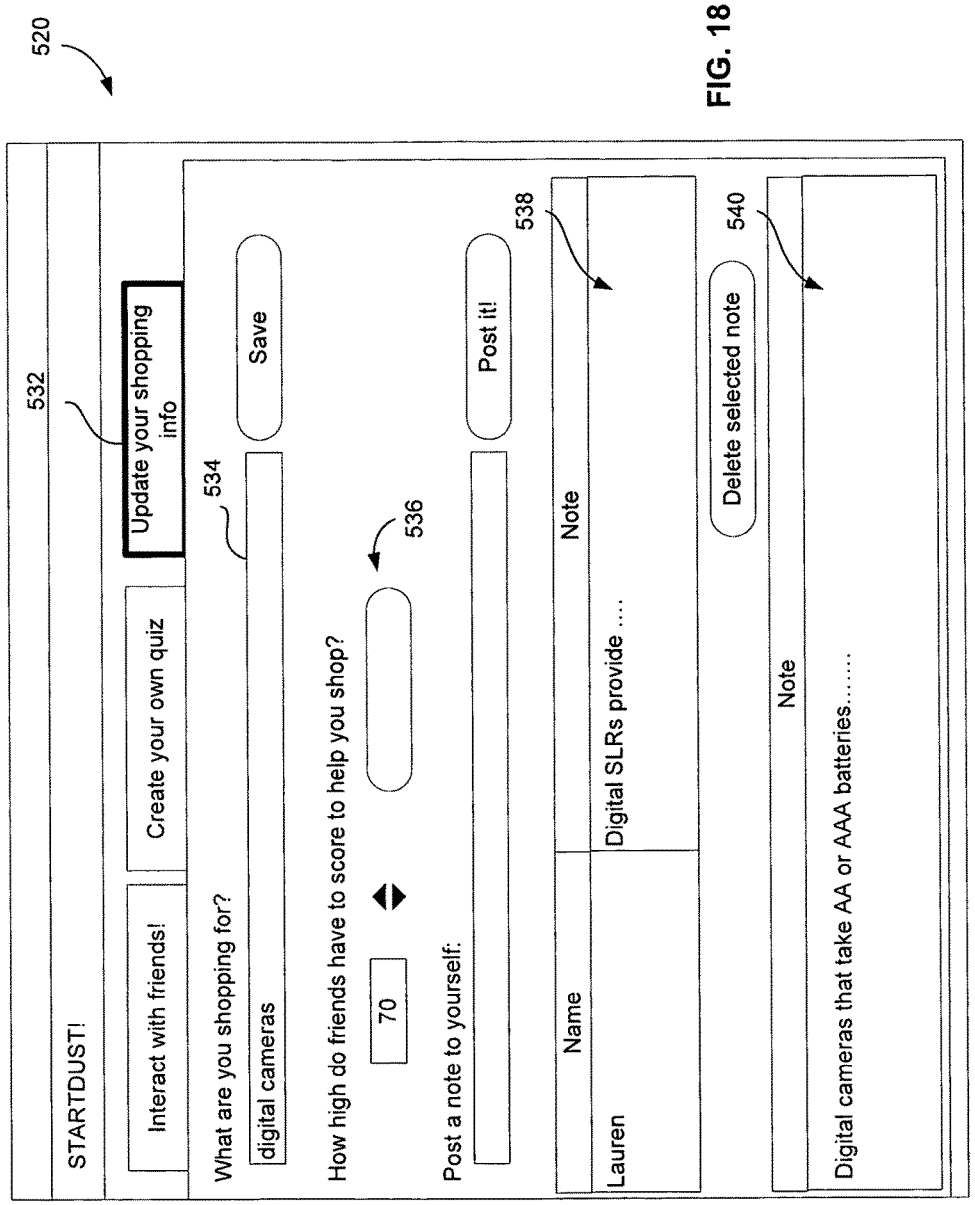
FIG. 18 is a diagram illustrating a UI for a system supporting a social networking application, according to an example embodiment.

FIG. 18 illustrates another display view, wherein UI 530 is presented in response to selection of tab 532, entitled "Update your shopping info." UI 530 includes questions related to shopping, such a text input field 534 to input an item and a selection field 536 to select a minimum quiz score or threshold value. UI 530 allows update and modification of shopping information. Alternate embodiments may allow additional or other fields for customization of a group member's shopping experience. Similarly, in other contexts, the questions, scoring and processing would be consistent with the selected context. U 530 further includes a private note section 538, and a public note section 540. A member is able to leave notes here for their own use, and is able to view notes left by other members. Notes may be edited, deleted, or modified. For example, a group member may desire to move a note from private note section 538 to public note section 540. Similarly, a group member may desire to respond to a note, for clarification or other communication. Such response is initiated from UI 530.

As discussed hereinabove, social network application 404 is accessible directly as a stand-alone application, or from within a services portal, such as a transaction system, or from within multiple external services portals. From within a service, a user is able to interact with social network application 404 using a tool downloaded to the service, or through an access portal in the service. In this way, multiple services are accessible through a common portal, where the user experiences the look and feel of one service while using multiple services. Multiple applications may then share common database information.

Figure 19:
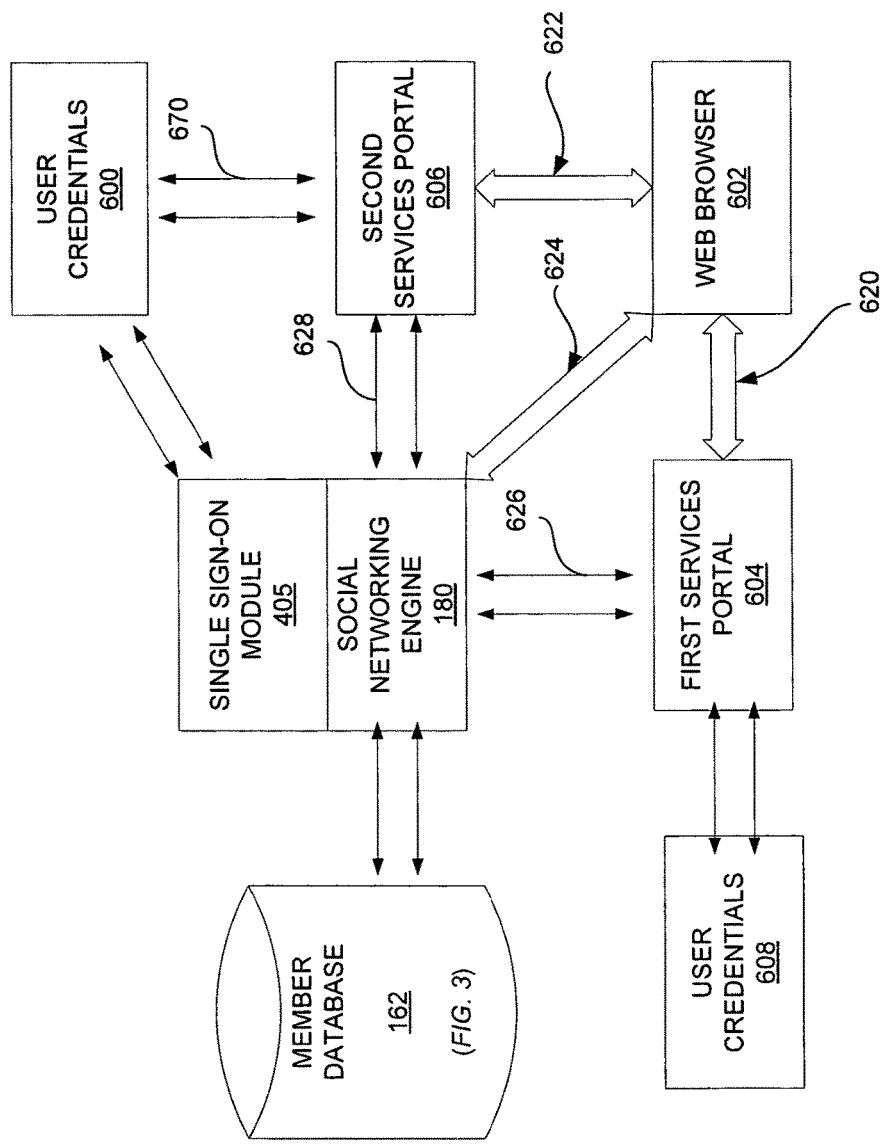
FIG. 19 is a block diagram illustrating modules various access scenarios in a system having a social networking engine, according to an example embodiment.

As illustrated in FIG. 19, access to social network application 404 through social networking engine 180 is available from within multiple services. A first services portal 604 may correspond to a transaction system, such as an online retailer or auction site. A second services portal 606 may correspond to a networking site, such as a social networking site providing connectivity among users. A user of any one of first services portal 604, second services portal 606, or social network application 404, may use web browser 602 as an entry through the Internet or other networked communication channel.

In a first example, a user accessed first services portal 604 for a first service. The user provides authentication and other login information to first services portal 604. The communication is sent via communication path 620. The first service then verifies the received authentication information with user credentials 608. Once a user has gained access to the first service, an option is provided to access social network application 404. A request is sent from web browser 602 to first services portal 604 to access social networking engine 180. The request is sent via communication path 626. The first service checks to see if a corresponding account has been set up with social network application 404. If not, the first service adds tools for social network application 404 to the user's account at the first service, and sends this information to social networking engine 180, which keeps a record of all users having access to the application. In this way, a user may access social network application 404 from the first service using a single sign-on procedure. In other words, the user does not have a separate user name or password to social network application 404 while logged onto the first service. In one example, a user signs on to Facebook and from their personalized page on Facebook accesses a shopping social network directly without further login, wherein the shopping social network effectively recognizes the user's Facebook identification. Once access is gained to social network application 404, the user is able to access resources in both services, such as group members in a group of social network application 404 as well as friends in the first service.

Accessing social network application 404 from the first service provides further access to multiple sources of information and networks of users with a single sign-on. Such a single sign-on method of access control enables a user to log in to one service and gain access to other resources including one or more other software systems without being prompted to login again. Typically different applications and resources support different authentication mechanisms, resulting in a single sign-on method that internally translates and stores various forms of user credentials in addition to the credential used for initial authentication. In one example, the user credentials provided from first services portal 604 is translated into a unique identifier consistent with the format used by social networking engine 180, but which is invisible to the user. User credential information is processed by single sign-on module 405.

In one example, a specialized toolbar is added to the UI associated with the first service, wherein a user may enter a user name and password to log onto a personalized site. This provides an optional toolbar for social network application 404 to the user's account on the first service. This option allows a user to select a user name and password, and provides information as to how to subscribe to or configure an example application toolbar. Generally, applications may be coordinated with an external service, and effectively run on top of the external service. And therefore, when a user accesses the external service, the UI of the external service presents an option for accessing an application, such as a social networking application having qualification testing.

Continuing with FIG. 19, a user may access social network application 404 directly or through a second services portal 606. For example, a second service may be a transaction service, such as an online retail service. A user logs on to the second services portal 606 via communication path 622, whereupon the user has access to the second service. From there, a user is able to access social network application 404 via communication path 628 to social networking engine 180. In the present example, the user credentials for the second service are stored in user credentials 600, which are shared with social networking engine 180. The user credentials allow the user to access social network application 404 without further log in or authentication. From social network application 404 a user may then access friends and resources available in the first service by requesting access from social networking engine 180 to first services portal 604 via communication path 626. In this scenario, the user credentials 608 for the first services portal 604 are first provided by the user to social networking engine 180 and are then available for provision from social networking engine 180 to first services portal 604.

Figure 20:
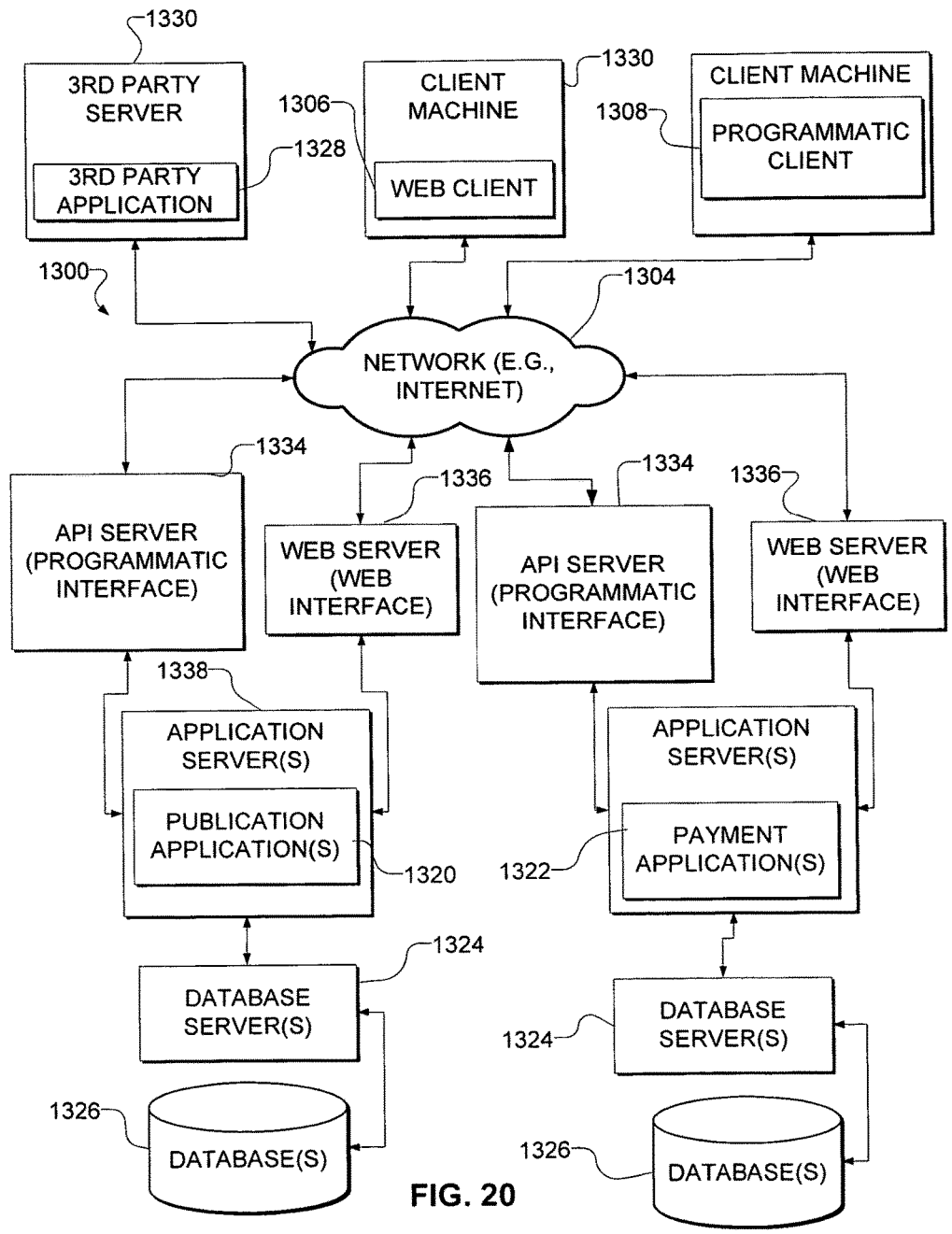
FIG. 20 is a block diagram illustrating a client-server system, according to an example embodiment.

FIG. 20 is a network diagram depicting a client-server system 1300, within which one example embodiment may be deployed to implement a qualification testing system.

A networked system 1300, in the example form of a network-based marketplace or publication system, provides server-side functionality, via a network 1304 (e.g., the Internet or Wide Area Network (WAN)) to one or more clients. FIG. 20 illustrates, for example, a web client 1306 (e.g., a browser, such as the Internet Explorer browser developed by Microsoft Corporation of Redmond, Wash. State), and a programmatic client 1308 executing on respective client machines 1330.

An API server 1334 and a web server 1336 are coupled to, and provide programmatic and web interfaces respectively to, one or more application servers 1338. The application servers 1338 host one or more publication applications 1320 and payment applications 1322. The application servers 1338 are, in turn, shown to be coupled to one or more databases servers 1324 that facilitate access to one or more databases 1326.

The publication applications 1320 may provide a number of marketplace functions and services to users that access the networked system 1300. The payment applications 1322 may likewise provide a number of payment services and functions to users. The payment applications 1322 may allow users to accumulate value (e.g., in a commercial currency, such as the U.S. dollar, or a proprietary currency, such as "points") in accounts, and then later to redeem the accumulated value for products (e.g., goods or services) that are made available via the publication applications 1320. While the marketplace and payment applications 1320 and 1322 are shown in FIG. 20 to form part of the networked system 1300, it will be appreciated that, in alternative embodiments, the payment applications 1322 may form part of a payment service that is separate and distinct from the networked system 1300.

Further, while the system 1300 shown in FIG. 20 employs a client-server architecture, the present invention is of course not limited to such an architecture, and could equally well find application in a distributed, or peer-to-peer, architecture system, for example. The various publication and payment applications 1320 and 1322 could also be implemented as standalone software programs, which do not necessarily have networking capabilities.

The web client 1306 accesses the various publication and payment applications 1320 and 1322 via the web interface supported by the web server 1336. Similarly, the programmatic client 1308 accesses the various services and functions provided by the marketplace and payment applications 1320 and 1322 via the programmatic interface provided by the API server 1314. The programmatic client 1308 may, for example, be a seller application to enable sellers to author and manage listings on the networked system 1300 in an off-line manner, and to perform batch-mode communications between the programmatic client 1308 and the networked system 1300.

FIG. 20 also illustrates a third party application 1328, executing on a third party server machine 1330, as having programmatic access to the networked system 1300 via the programmatic interface provided by the API server 1334. For example, the third party application 1328 may, utilizing information retrieved from the networked system 1300, support one or more features or functions on a website hosted by the third party. The third party website may, for example, provide one or more promotional, marketplace or payment functions that are supported by the relevant applications of the networked system 1300.

Figure 21:
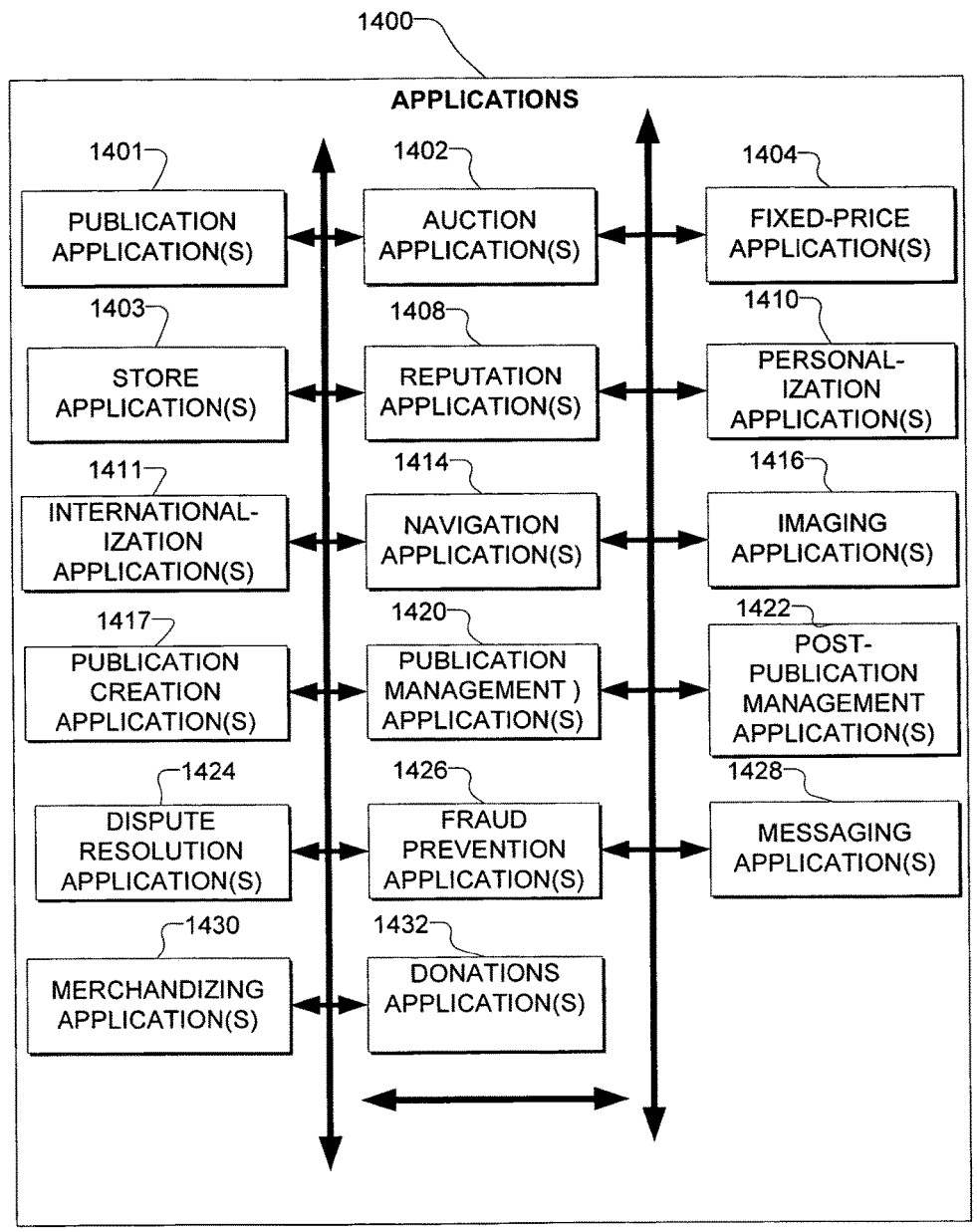
FIG. 21 is a block diagram illustrating multiple applications, according to an example embodiment.

FIG. 21 is a block diagram illustrating multiple applications 1400 that, in one example embodiment, are provided as part of the networked system 1300. The applications 1400 may include or be part of publication applications 1320 and/or payment applications 1322. The applications 1400 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 1326 via the database servers 1328.

The networked system 1300 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication applications 1320 are shown to include at least one publication application 1401 and one or more auction applications 1402 which support auction-format listing and price setting mechanisms (e.g., English, Dutch, Vickrey, Chinese, Double, Reverse auctions etc.). The various auction applications 1402 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1404 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1403 allow a seller to group listings within a "virtual" store, which may be branded and otherwise personalized by and for the seller. Such a virtual store may also offer promotions, incentives and features that are specific and personalized to a relevant seller.

Reputation applications 1408 allow users that transact, utilizing the networked system 1300, to establish, build and maintain reputations, which may be made available and published to potential trading partners. Consider that where, for example, the networked system 1300 supports person-to-person trading, users may otherwise have no history or other reference information whereby the trustworthiness and credibility of potential trading partners may be assessed. The reputation applications 1408 allow a user, for example through feedback provided by other transaction partners, to establish a reputation within the networked system 1300 over time. Other potential trading partners may then reference such a reputation for the purposes of assessing credibility and trustworthiness.

Personalization applications 1410 allow users of the networked system 1300 to personalize various aspects of their interactions with the networked system 1300. For example a user may, utilizing an appropriate personalization application 1410, create a personalized reference page at which information regarding transactions to which the user is (or has been) a party may be viewed. Further, a personalization application 1410 may enable a user to personalize listings and other aspects of their interactions with the networked system 1300 and other parties.

The networked system 1300 may support a number of marketplaces that are customized, for example, for specific geographic regions. A version of the networked system 1300 may be customized for the United Kingdom, whereas another version of the networked system 1300 may be customized for the United States. Each of these versions may operate as an independent marketplace, or may be customized (or internationalized) presentations of a common underlying marketplace. The networked system 1300 may accordingly include a number of internationalization applications 1411 that customize information (and/or the presentation of information) by the networked system 1300 according to predetermined criteria (e.g., geographic, demographic or marketplace criteria). For example, the internationalization applications 1411 may be used to support the customization of information for a number of regional websites that are operated by the networked system 1300 and that are accessible via respective web servers 1336.

Navigation of the networked system 1300 may be facilitated by one or more navigation applications 1414. For example, a search application (as an example of a navigation application) may enable key word searches of listings published via the networked system 1300. A browse application may allow users to browse various category, catalogue, or inventory data structures according to which listings may be classified within the networked system 1300. Various other navigation applications may be provided to supplement the search and browsing applications.

In order to make listings, available via the networked system 1300, as visually informing and attractive as possible, the publication applications 1320 may include one or more imaging applications 1416 utilizing which users may upload images for inclusion within listings. An imaging application 1416 also operates to incorporate images within viewed listings. The imaging applications 1416 may also support one or more promotional features, such as image galleries that are presented to potential buyers. For example, sellers may pay an additional fee to have an image included within a gallery of images for promoted items.

Listing creation applications 1417 allow sellers conveniently to author listings pertaining to goods or services that they wish to transact via the networked system 1300, and listing management applications 1420 allow sellers to manage such listings. Specifically, where a particular seller has authored and/or published a large number of listings, the management of such listings may present a challenge. The listing management applications 1420 provide a number of features (e.g., auto-relisting, inventory level monitors, etc.) to assist the seller in managing such listings. One or more post-listing management applications 1422 also assist sellers with a number of activities that typically occur post-listing. For example, upon completion of an auction facilitated by one or more auction applications 1402, a seller may wish to leave feedback regarding a particular buyer. To this end, a post-listing management application 1422 may provide an interface to one or more reputation applications 1408, so as to allow the seller conveniently to provide feedback regarding multiple buyers to the reputation applications 1408.

Dispute resolution applications 1424 provide mechanisms whereby disputes arising between transacting parties may be resolved. For example, the dispute resolution applications 1424 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 1426 implement fraud detection and prevention mechanisms to reduce the occurrence of fraud within the networked system 1300.

Messaging applications 1428 are responsible for the generation and delivery of messages to users of the networked system 1300, such messages for example advising users regarding the status of listings at the networked system 1300 (e.g., providing "outbid" notices to bidders during an auction process or to provide promotional and merchandising information to users). Respective messaging applications 1428 may utilize any one have a number of message delivery networks and platforms to deliver messages to users. For example, messaging applications 1428 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 1430 support various merchandising functions that are made available to sellers to enable sellers to increase sales via the networked system 1300. The merchandising applications 80 also operate the various merchandising features that may be invoked by sellers, and may monitor and track the success of merchandising strategies employed by sellers.

The networked system 1300 itself, or one or more parties that transact via the networked system 1300, may operate loyalty programs that are supported by one or more loyalty/promotions applications 1432. For example, a buyer may earn loyalty or promotions points for each transaction established and/or concluded with a particular seller, and be offered a reward for which accumulated loyalty points can be redeemed.

Various tables that may be maintained within the databases 1326, and that are utilized by and support the applications 1320 and 1322. A user table contains a record for each registered user of the networked system 1300, and may include identifier, address and financial instrument information pertaining to each such registered user. A user may operate as a seller, a buyer, or both, within the networked system 1300. In one example embodiment, a buyer may be a user that has accumulated value (e.g., commercial or proprietary currency), and is accordingly able to exchange the accumulated value for items that are offered for sale by the networked system 1300.

The tables also include an items table in which are maintained item records for goods and services that are available to be, or have been, transacted via the networked system 1300. Each item record within the items table may furthermore be linked to one or more user records within the user table, so as to associate a seller and one or more actual or potential buyers with each item record.

A transaction table contains a record for each transaction (e.g., a purchase or sale transaction) pertaining to items for which records exist within the items table. An order table is populated with order records, each order record being associated with an order. Each order, in turn, may be with respect to one or more transactions for which records exist within the transaction table.

Bid records within a bids table each relate to a bid received at the networked system 1300 in connection with an auction-format listing supported by an auction application 1402. A feedback table is utilized by one or more reputation applications 1408, in one example embodiment, to construct and maintain reputation information concerning users. A history table maintains a history of transactions to which a user has been a party. One or more attributes tables record attribute information pertaining to items for which records exist within the items table. Considering only a single example of such an attribute, the attributes tables may indicate a currency attribute associated with a particular item, the currency attribute identifying the currency of a price for the relevant item as specified in by a seller.

Certain embodiments are described herein as including logic or a number of components, modules, or mechanisms. A component is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Figure 22:
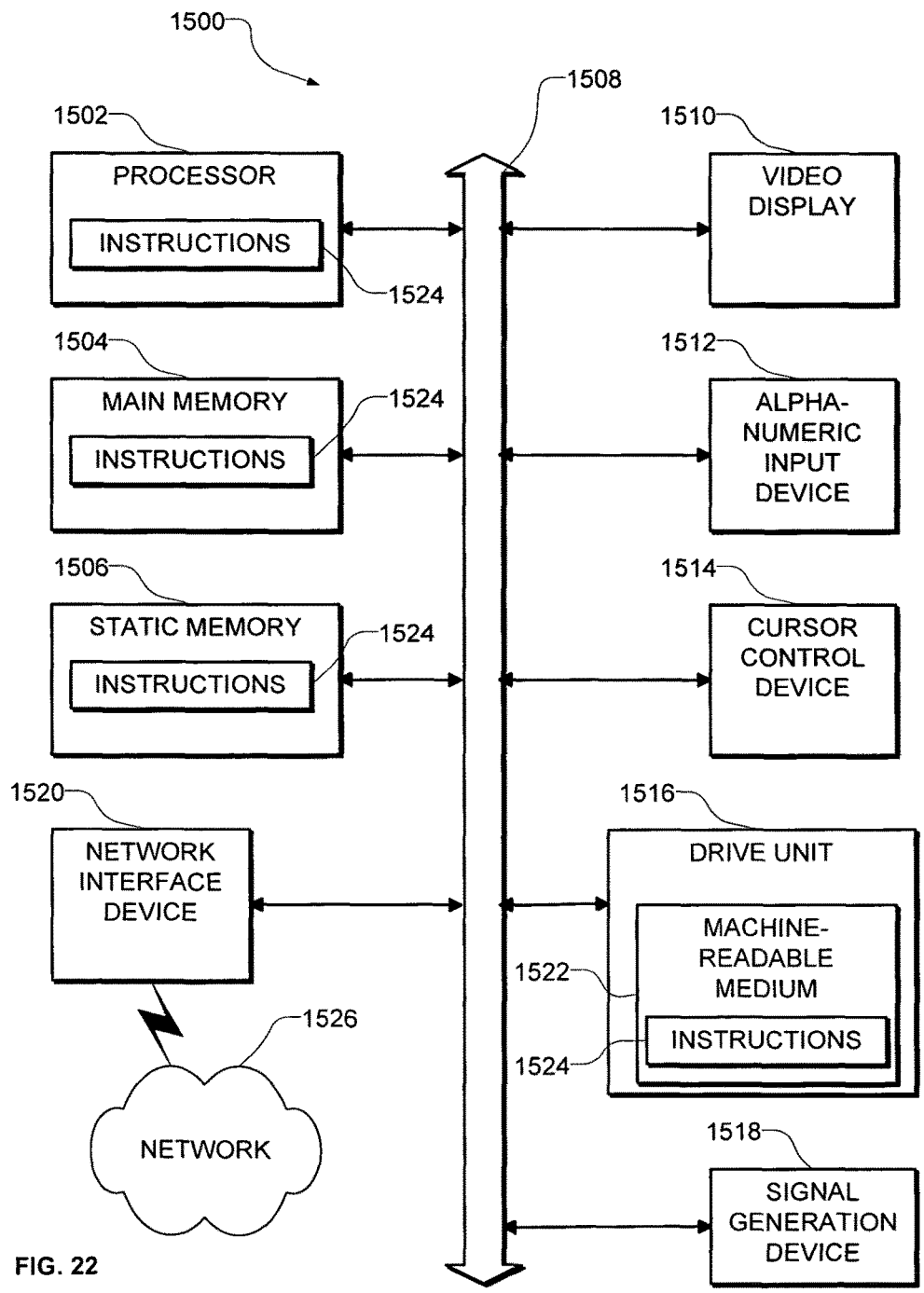
FIG. 22 is a block diagram illustrating a computing system configured to implement an image processing service, according to an example embodiment.

FIG. 22 is a block diagram of a machine in the example form of a computer system 1500 within which instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1524 may further be transmitted or received over a communications network 1526 using a transmission medium. The software 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method for automated group generation and network access, the method comprising:
   receiving, at a first server computer comprising a memory and one or more processors, a plurality of collaborative group communications associated with a collaborative group from a social networking service, the plurality of collaborative group communications comprising:
   information describing a first item type available for purchase via an ecommerce system;
   a set of group criteria for qualifying members of the group; and
   a qualification assessment used to determine admittance to the collaborative group, wherein the social networking service being provided on a computing system external to the ecommerce system;
   automatically analyzing, by the first server computer using the set of group criteria, database information from one or more database servers, to identify a user associated with a client machine;
   automatically communicating, from the first server computer to the client machine of the user in response to identification of the user, the qualification assessment used to determine admittance to the collaborative group;
   receiving, at the first server computer from the client machine, a response communication comprising a qualification assessment response;
   evaluating, by the first server computer, the qualification assessment response for the user to determine a user score, the qualification assessment comprising questions testing specific knowledge of the user about the first item type available for purchase via the ecommerce system, the user score being based on user answers to the questions provided via the client machine of the user;
   automatically storing, by the first server computer, a set of qualified group member information in a member database device in response to the evaluation of the qualification assessment response; and
   automatically providing, by the first server computer, network access to the user as a member to the collaborative group based on the user score satisfying a set of access criteria, the network access comprising access for a social network application of the ecommerce system for connection and communications among members of to the collaborative group via the social networking service over a communication network.

2. The method of claim 1, the qualification assessment further comprising questions testing knowledge of the user about at least one current member of the collaborative group.

3. The method of claim 1, further comprising providing tools to participate in the collaborative group to the member.

4. The method of claim 1, further comprising:
   providing access to the collaborative group from a networked computing service in addition to the social networking service.

5. The method of claim 1, further comprising providing instructions for a user interface having a first view to present a collaborative space to members of the collaborative group, and having a second view to present an editing space for a member of the collaborative group to edit the qualification assessment.

6. The method of claim 5, wherein the user interface has a third view to present the qualification assessment, and a fourth view to present the user score on the qualification assessment.

7. The method of claim 5, wherein the second view presents options to modify the qualification assessment and options to modify the admittance criterion.

8. The method of claim 5, further comprising:
   receiving notes from a member of the collaborative group to present in the collaborative space;
   providing the notes for presentation in the first view; and
   sending the notes to an update service associated with the networked computing service, wherein users of the networked computing service receive update information as registered users with the social networking service.

9. The method of claim 1, wherein a single sign-on is used to access the collaborative group and the social networking service.

10. The method of claim 1, further comprising:
    receiving a request to access the collaborative group;
    receiving at least one user credential from the social networking service; and
    processing the request using the at least one user credential.

11. The method of claim 1, wherein evaluating the qualification assessment is performed after completing a first portion of the qualification assessment to determine an interim user score, and
    wherein the method further comprises admitting the user as a member based on the interim score satisfying an interim admittance criterion.

12. The method of claim 1 wherein the plurality of collaborative group communications comprise a plurality of queries received via a Hypertext Transfer Protocol (HTTP) Service request at a predetermined Server_Address value, each collaborative group communication comprising a command value and one or more parameters in accordance with a qualification system application programming interface (API).

13. A non-transitory computer-readable medium comprising instructions that, when executed by one or more processors of a first server computer, cause the first server computer to perform operations comprising:
    receiving a plurality of collaborative group communications associated with a collaborative group from a social networking service, the plurality of collaborative group communications comprising:
    information describing a first item type available for purchase via an ecommerce system;
    a set of group criteria for qualifying members of the group; and
    a qualification assessment used to determine admittance to the collaborative group, wherein the social networking service being provided on a computing system external to the ecommerce system;
    automatically analyzing, by the first server computer using the set of group criteria, database information from one or more database servers, to identify a user associated with a client machine;
    automatically communicating, from the first server computer to the client machine of the user in response to identification of the user, the qualification assessment used to determine admittance to the collaborative group;

receiving, at the first server computer from the client machine, a response communication comprising a qualification assessment response;

evaluating, by the first server computer, the qualification assessment response for the user to determine a user score, the qualification assessment comprising questions testing specific knowledge of the user about the first item type available for purchase via the ecommerce system, the user score being based on user answers to the questions provided via the client machine of the user;

automatically storing a set of qualified group member information in a member database device in response to the evaluation of the qualification assessment response; and automatically providing network access to the user as a member to the collaborative group based on the user score satisfying a set of access criteria, the network access comprising access for a social network application of the ecommerce system for connection and communications among members of to the collaborative group via the social networking service over a communication network.

14. The non-transitory computer readable medium of claim 13, wherein the instructions further cause the first server computer to perform operations comprising:

generating and presenting a user interface having a first view to present a collaborative space to members of the collaborative group, and having a second view to present an editing space for a member of the collaborative group to edit the qualification assessment;

receiving notes from a member of the collaborative group to present in the collaborative space;

processing the notes for presentation in the first view; and sending the notes to an update service associated with the networked computing service, wherein users of the networked computing service receive update information as registered users with the social networking service.

15. The non-transitory computer readable medium of claim 13, wherein evaluating the qualification assessment is performed after completing a first portion of the qualification assessment to determine an interim user score, and wherein the method further comprises admitting the user as a member based on the interim score satisfying an interim admittance criterion.

16. A device for automated group generation and network access comprising:

a network interface device configured to receive a plurality of collaborative group communications associated with a collaborative group from a social networking service, the plurality of collaborative group communications comprising:

information describing a first item type available for purchase via an ecommerce system;

a set of group criteria for qualifying members of the group; and a qualification assessment used to determine admittance to the collaborative group, wherein the social networking service being provided on a computing system external to the ecommerce system;

a memory configured to store the set of group criteria and the qualification assessment; and one or more processors coupled to the network interface device and configured to:

automatically analyze using the set of group criteria, database information from one or more database servers, to identify a user associated with a client machine;

automatically initiate communication, from the first server computer to the client machine of the user in response to identification of the user, the qualification assessment used to determine admittance to the collaborative group;

process a response communication comprising a qualification assessment response;

evaluate, by the first server computer the qualification assessment response for the user to determine a user score, the qualification assessment comprising questions testing specific knowledge of the user about the first item type available for purchase via the ecommerce system, the user score being based on user answers to the questions provided via the client machine of the user;

automatically initiate storage of a set of qualified group member information in a member database device in response to the evaluation of the qualification assessment response; and automatically provide network access to the user as a member to the collaborative group based on the user score satisfying a set of access criteria, the network access comprising access for a social network application of the ecommerce system for connection and communications among members of to the collaborative group via the social networking service over a communication network.

17. The device of claim 16 wherein the one or more processors are further configured to:

generating a user interface having a first view to present a collaborative space to members of the collaborative group, and having a second view to present an editing space for a member of the collaborative group to edit the qualification assessment;

initiate transmission of the user interface to the client machine;

process notes from a member of the collaborative group to present in the collaborative space for presentation in the first view; and initiate transmission of the notes to an update service associated with the networked computing service, wherein users of the networked computing service receive update information as registered users with the social networking service.

18. The device of claim 16 wherein evaluating the qualification assessment is performed after completing a first portion of the qualification assessment to determine an interim user score, and wherein the method further comprises admitting the user as a member based on the interim score satisfying an interim admittance criterion.

* * * * *